(12) United States Patent
Shinomoto et al.

(10) Patent No.: US 10,796,601 B2
(45) Date of Patent: Oct. 6, 2020

(54) INFORMATION PROCESSING METHOD, INFORMATION PROCESSING SYSTEM, AND TERMINAL

(71) Applicant: Panasonic Intellectual Property Management Co., Ltd., Osaka (JP)

(72) Inventors: Yuki Shinomoto, Tokyo (JP); Hiroyuki Kubotani, Hyogo (JP); Mitsuhiro Aso, Osaka (JP); Yasuhiro Yuki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 15/820,486

(22) Filed: Nov. 22, 2017

(65) Prior Publication Data

US 2018/0158363 A1   Jun. 7, 2018

(30) Foreign Application Priority Data

Dec. 1, 2016  (JP) .................................. 2016-234490
Jul. 25, 2017 (JP) .................................. 2017-143201

(51) Int. Cl.
  *G09B 19/00* (2006.01)
  *G06F 16/22* (2019.01)
  (Continued)

(52) U.S. Cl.
  CPC ............ *G09B 19/0092* (2013.01); *A23L 5/10* (2016.08); *G06F 16/22* (2019.01); *G06K 9/00718* (2013.01); *G06Q 10/00* (2013.01); *G06T 11/60* (2013.01); *G09B 5/02* (2013.01); *A23V 2002/00* (2013.01); *G10L 13/00* (2013.01)

(58) Field of Classification Search
  CPC .... G09B 19/0092; A23L 5/10; G06K 9/00718
  See application file for complete search history.

(56) References Cited

U.S. PATENT DOCUMENTS 10,210,444 B2 *  2/2019  Kamei ............. G06K 19/06037
2001/0044759 A1 * 11/2001  Kutsumi ................ G06Q 30/02
                                          705/26.7

(Continued)

FOREIGN PATENT DOCUMENTS

JP   2010-191745   9/2010
JP   2011-081737   4/2011

OTHER PUBLICATIONS

The Extended European Search Report dated Feb. 5, 2018 for European Patent Application No. 17204325.9.

*Primary Examiner* — Xuan M Thai
*Assistant Examiner* — Sadaruz Zaman
(74) *Attorney, Agent, or Firm* — Greenblum & Bernstein, P.L.C.

(57) ABSTRACT

First information including related information relating to a cooking action to be carried out by a cook is acquired, a presentation device is made to present the related information, it is determined whether or not an action of the cook that is specified based on second information is the cooking action, an index indicating a degree of attention of the cook recommended for the cooking action is acquired, and the information amount of the related information presented is altered in accordance with the degree of attention indicated by the acquired index.

20 Claims, 19 Drawing Sheets

(51) Int. Cl.
*G06Q 10/00* (2012.01)
*A23L 5/10* (2016.01)
*G06K 9/00* (2006.01)
*G06T 11/60* (2006.01)
*G09B 5/02* (2006.01)
*G10L 13/00* (2006.01)

(56) References Cited

U.S. PATENT DOCUMENTS

| | | | |
|---|---|---|---|
| 2005/0071328 A1* | 3/2005 | Lawrence | G06F 16/9535 |
| 2009/0276487 A1* | 11/2009 | Jensen | G06F 19/3418 |
| | | | 709/203 |
| 2010/0320189 A1* | 12/2010 | Buchheit | H05B 6/6441 |
| | | | 219/488 |
| 2013/0185646 A1* | 7/2013 | Wiggins | H04L 67/306 |
| | | | 715/739 |
| 2013/0224694 A1* | 8/2013 | Moore | G16H 20/60 |
| | | | 434/127 |
| 2014/0081955 A1* | 3/2014 | Osaki | G06F 16/24 |
| | | | 707/722 |
| 2016/0081515 A1* | 3/2016 | Aboujassoum | A47J 36/00 |
| | | | 426/231 |
| 2016/0350704 A1* | 12/2016 | Minvielle | G06Q 10/087 |
| 2016/0350715 A1* | 12/2016 | Minvielle | G01N 33/02 |
| 2017/0020324 A1* | 1/2017 | Young | A47J 27/10 |
| 2017/0139385 A1* | 5/2017 | Young | G05B 19/048 |
| 2018/0158363 A1* | 6/2018 | Shinomoto | G06Q 10/00 |

* cited by examiner

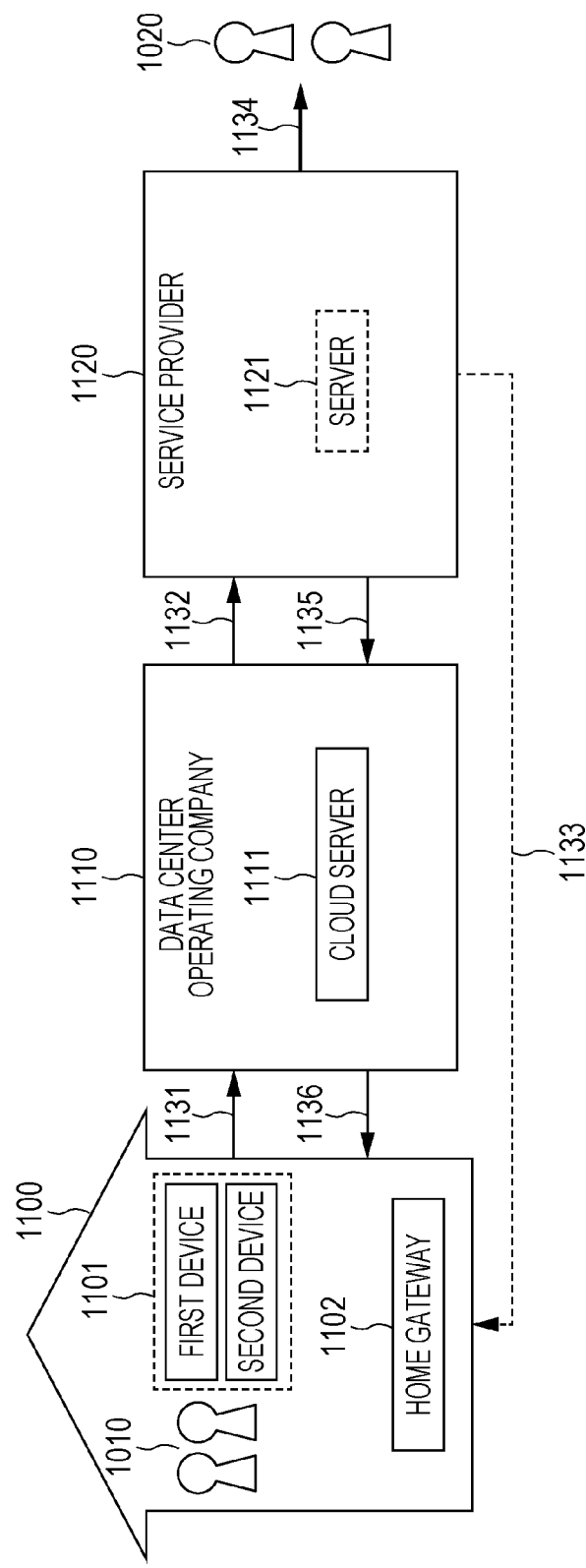

FIG. 6

| PROCESS ID 109A | DISH NAME 109B | COOKING APPLIANCE 109C | COOKING ACTION 109D | COOKING INSTRUCTION 109E | IMAGE URL 109F |
|---|---|---|---|---|---|
| 1 | MACKEREL GRILLED WITH SALT | KITCHEN KNIFE | FILLET FISH | FILLET THE MACKEREL. | https://example.com/movie/ex0.png |
| 2 | MACKEREL GRILLED WITH SALT | NONE | SEASONING | SPRINKLE SOME SALT ON THE MACKEREL. | https://example.com/movie/ex1.png |
| 3 | MACKEREL GRILLED WITH SALT | GRILL | GRILL | PLACE THE MACKEREL IN THE GRILL AND GRILL BOTH SIDES FOR 10 MINUTES IN TOTAL. | https://example.com/movie/ex2.png |
| 4 | MISO SOUP | KITCHEN KNIFE | CUT (MEDIUM SIZE) | CUT TOFU INTO SMALL CUBES. | https://example.com/movie/ey0.png |
| 5 | MISO SOUP | POT | BOIL WATER | POUR 300 cc OF WATER INTO THE POT, ADD THE TOFU, AND BRING TO THE BOIL. | https://example.com/movie/ey1.png |
| 6 | MISO SOUP | NONE | SEASONING | TURN OFF THE HEAT AND ADD MISO. | https://example.com/movie/ey2.png |

109

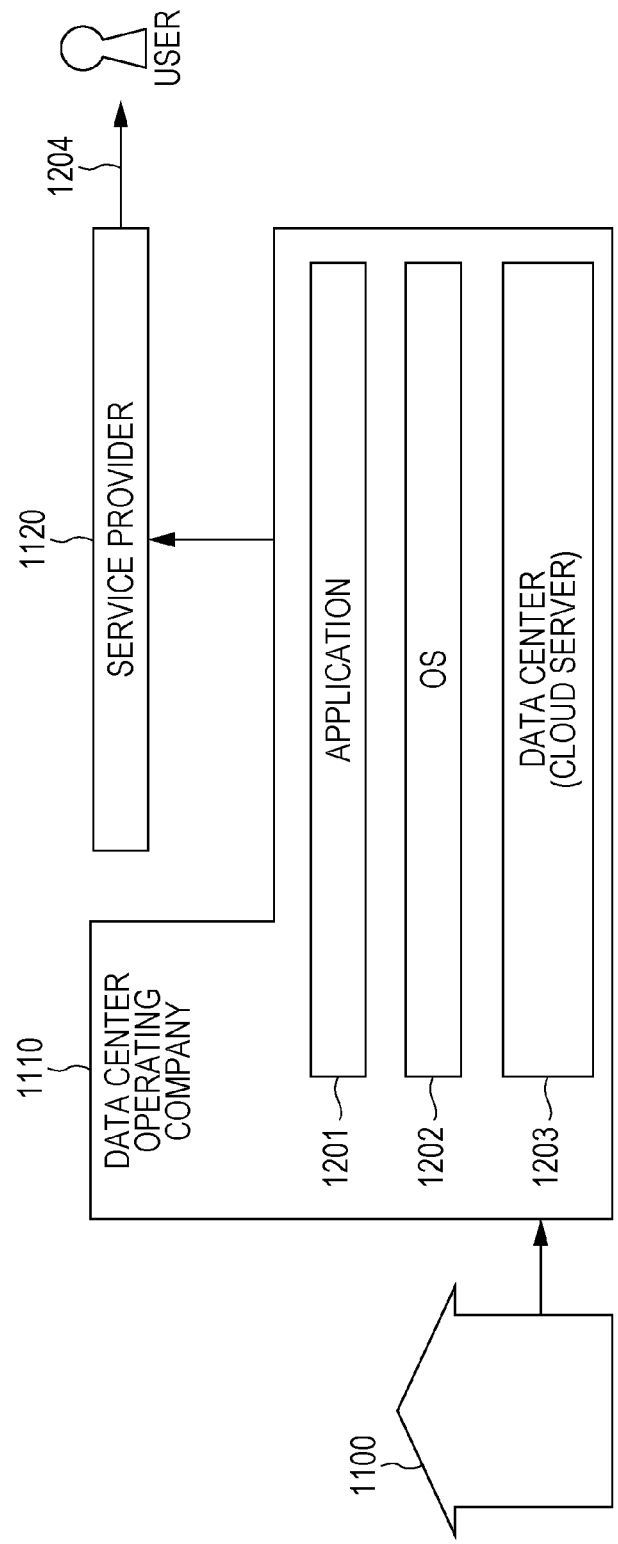

INFORMATION PROCESSING METHOD, INFORMATION PROCESSING SYSTEM, AND TERMINAL

BACKGROUND

1. Technical Field

The present disclosure relates to an information processing method, an information processing system, and a terminal.

2. Description of the Related Art

To date, in systems for supporting the cooking behaviors of users, methods have been proposed in which images depicting cooking methods are projected onto ingredients. Japanese Unexamined Patent Application Publication No. 2010-191745 discloses a technique in which an ingredient is captured by a camera and the type of ingredient is identified, and an image depicting a cooking method for the identified ingredient is projected superimposed on the ingredient by a projector.

However, further investigation has been necessary in order to support the user in carrying out cooking more appropriately.

SUMMARY

In one general aspect, the techniques disclosed here feature an information processing method including, using a processor that carries out information processing: acquiring first information including related information relating to a cooking action to be carried out by a cook; outputting the related information to a presentation device in order to cause the presentation device to present the related information; acquiring second information for specifying the form of an action of the cook; specifying the action of the cook, based on the second information; determining whether or not the specified action of the cook is a cooking action; acquiring an index indicating a degree of attention of the cook recommended for the cooking action, in the case where it is determined that the specified action of the cook is the cooking action; and altering the information amount of the related information presented, in accordance with the degree of attention indicated by the acquired index.

According to the aforementioned aspect, it is possible to support the user in carrying out cooking more appropriately.

It should be noted that general or specific aspects hereof may be realized by a server device, a system, an integrated circuit, a computer program, or a recording medium such as a computer-readable CD-ROM, and may be realized by any combination of a server device, a system, an integrated circuit, a computer program, or a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a first explanatory diagram depicting an overall view of a service provided by a cooking support system according to an embodiment;

FIG. 6 is an explanatory diagram depicting a list of cooking processes according to the embodiment;

FIG. 21 is a diagram depicting an overall view of a service provided by an information management system in a type 4 service (SaaS utilizing type of cloud service).

Figure 1B:
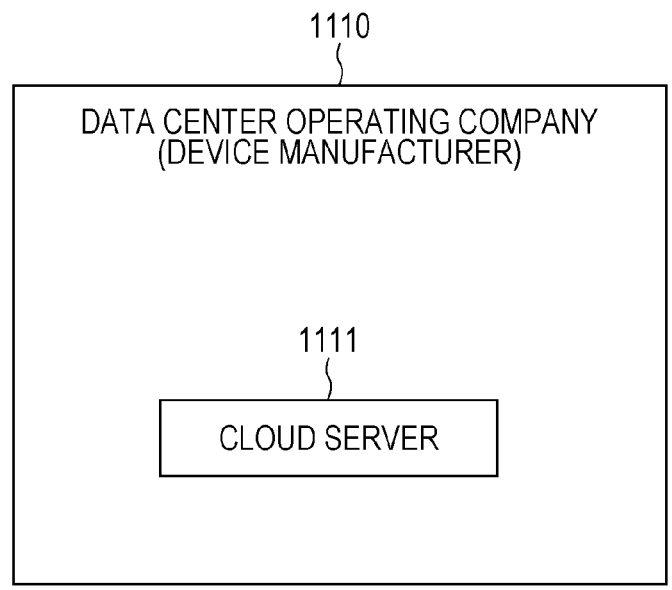
FIG. 1B is a second explanatory diagram depicting an overall view of a service provided by the cooking support system according to the embodiment.

DETAILED DESCRIPTION (Findings Forming the Basis for the Present Disclosure)

The present inventor discovered that the following problems occur in relation to the system described in the "Description of the Related Art" section.

In Japanese Unexamined Patent Application Publication No. 2010-191745, an ingredient is captured by a camera and the type of ingredient is identified, and an image depicting a cooking method for the identified ingredient is projected superimposed on the ingredient by a projector. However, in Japanese Unexamined Patent Application Publication No. 2010-191745, no investigation whatsoever is carried out regarding a technique for supporting the user in carrying out cooking appropriately, on the basis of the degree of risk of dangerous cooking actions (for example, the action of cutting an ingredient with a kitchen knife) when the user carries out cooking actions while viewing the image.

An information processing method according to an aspect of the present disclosure includes, using a processor:
acquiring first information including related information relating to a cooking action to be carried out by a cook;
outputting the related information to a presentation device in order to cause the presentation device to present the related information;
acquiring second information for specifying the form of an action of the cook;
specifying the action of the cook, based on the second information;
determining whether or not the specified action of the cook is a cooking action;
acquiring an index indicating a degree of attention of the cook recommended for the cooking action, in the case where it is determined that the specified action of the cook is the cooking action; and
altering the information amount of the related information presented, in accordance with the degree of attention indicated by the acquired index.

According to the aforementioned aspect, a cooking support system presents related information when the user is not carrying out cooking or when the user is carrying out cooking for which the degree of attention to be paid by the user is comparatively low. However, when the user is carrying out cooking for which the degree of attention to be paid by the user is comparatively high, the information amount of the related information presented on a presentation device is altered from when that is not the case. Thus, the cooking support system suppresses the attention of the user being excessively directed toward the cooking support system, particularly instruction information presented on the presentation device, thereby reducing factors that hinder close observation of the cooking subject. In this way, the cooking support system can present related information in such a way that the user is able to carry out cooking more appropriately.

It should be noted that when the user is not able to carry out cooking appropriately, problems can occur in that it is necessary for some or all of the cooking to be redone, and there is an increase in the consumption of energy resources such as electrical power. The cooking support system of the present disclosure is able to provide support in such a way that the user is able to carry out cooking more appropriately, and therefore there is also an effect in that an increase in the consumption of energy resources such as electrical power is prevented in advance.

For example, the related information may include information indicating the cooking action to be carried out by the cook, and in the determining, it may be determined whether or not the specified action of the cook based on the second information is the cooking action indicated by the information included in the related information of the first information.

According to the aforementioned aspect, a specific cooking action of the cook can be specified.

For example, the form of the action of the cook may include whether or not the cooking action is present or what the type of the cooking action is.

According to the aforementioned aspect, it is possible to specifically specify whether or not the cooking action is present or what the type of the cooking action is, as the form of the cooking action.

For example, the form of the action of the cook may include whether or not there is an instrument being used for the cooking action or what the type of the instrument is.

According to the aforementioned aspect, it is possible to specifically specify whether or not there is an instrument being used for the cooking action or what the type of the instrument is, as the form of the cooking action.

For example, the related information may include instruction information instructing the cooking action to be carried out by the cook,
in the outputting, the related information including the instruction information may be output to the presentation device,
the degree of attention of the cook indicated by the index may be a degree of attention to be paid to a cooking subject by the cook,
in the altering of the information amount of the related information, the information amount of the related information may be altered by reducing an information amount of the instruction information in the case where the degree of attention of the cook indicated by the index is greater than a threshold value,
and the information processing method may further include outputting the related information having the altered information amount to the presentation device in order to cause the presentation device to present the related information having the altered information amount.

According to the aforementioned aspect, the attention of the user being excessively directed toward the information processing system, particularly the instruction information presented on the presentation device as the related information, is suppressed, thereby reducing factors that hinder close observation of the cooking subject. In this way, the information processing system can provide support with which the user is able to carry out cooking more appropriately with attention being paid to the cooking subject.

For example, the presentation device may include a display or a projector, and in the outputting of the related information, an image corresponding to the related information may be output to the presentation device in order to cause the display to display the image or the projector to project the image.

According to the aforementioned aspect, owing to a specific configuration in which a display or a projector is used, the information processing system can provide support in such a way that the user is able to carry out cooking more appropriately.

For example, the related information may include instruction information instructing a cooking action to be carried out by the cook, the instruction information may include a plurality of images relating to an instruction for the cooking action, in the outputting, the plurality of images included in the instruction information may be output to the presentation device as images corresponding to the related information, the index indicating the degree of attention of the cook may be an index indicating a degree of attention to be paid to a subject being cooked by the cook, in the altering of the information amount of the related information, the information amount of the related information may be altered by a portion of the plurality of images being deleted, and the information processing method may further include outputting the related information having the altered information amount to the presentation device in order to cause the presentation device to present the related information having the altered information amount.

According to the aforementioned aspect, the information processing method, specifically, can provide support in such a way that the user is able to carry out cooking more appropriately, by altering an operation in such a way that only a portion of the images corresponding to the instruction information are displayed or projected. This is because, by displaying only a portion of the displayed images or projecting only a portion of the projected images, the attention of the user being excessively directed toward the cooking support system is suppressed, and factors that hinder close observation of the cooking subject are reduced.

For example, the plurality of images may include a first image corresponding to character string information indicating a cooking procedure that allows the cook to carry out the cooking action and a second image corresponding to the external appearance of an object that is a cooking subject, and the portion of the plurality of images may be constituted by the second image.

According to the aforementioned aspect, due to only the first image corresponding to the character string information being presented and the second image corresponding to the external appearance no longer being presented, the awareness of the user with respect to the images can be reduced with the information amount of the cooking procedure being maintained.

For example, the plurality of images may include a first image corresponding to character string information indicating a cooking procedure that allows the cook to carry out the cooking action, and the portion of the plurality of images may include an image corresponding to one or more characters included in the character string information.

According to the aforementioned aspect, in the information processing system, specifically, the attention of the user being excessively directed toward the information processing system can be suppressed by not allowing the image corresponding to one or more characters included in the character string information to be displayed.

For example, the one or more characters may be different from a character string registered in advance in a memory.

According to the aforementioned aspect, in the information processing system, specifically, the attention of the user being excessively directed toward the information processing system can be suppressed by not allowing the one or more characters other than the character string registered in advance to be displayed as a portion of the plurality of characters included in the character string information.

For example, in the altering of the information amount of the related information, the information amount of the related information may be altered by all of the plurality of images being deleted.

According to the aforementioned aspect, the information processing method, specifically, can provide support in such a way that the user is able to carry out cooking more appropriately, by eliminating the display of the images corresponding to the instruction information. This is because, by eliminating the display of the aforementioned images, the attention of the user being excessively directed toward the cooking support system is suppressed, and factors that hinder close observation of the cooking subject are reduced.

For example, the presentation device may further include a speaker, and the information processing method may further include outputting, to the presentation device, speech data including speech corresponding to content instructed by the instruction information, in order to cause the speaker to output the speech corresponding to the content instructed by the instruction information, in the case where the information amount of the instruction information has been altered as the related information.

According to the aforementioned aspect, the information processing method, specifically, can provide support in such a way that the user is able to carry out cooking more appropriately, by presenting information by means of sound with the display of images being eliminated. This is because, by eliminating the display of the images, the attention of the user being excessively directed toward the cooking support system is suppressed, and factors that hinder close observation of the cooking subject are reduced by presenting information by means of sound.

For example, the related information included in the first information may include information indicating a plurality of cooking actions, in the specifying, a plurality of actions of the cook may be specified as actions of the cook, in the determining, it may be determined whether or not the specified plurality of actions of the cook are the plurality of cooking actions, in the acquiring of the index, indexes each indicating a degree of attention of the cook recommended for each of the plurality of cooking actions may be acquired in the case where it is determined that the specified plurality of actions of the cook are the plurality of cooking actions, and in the altering, the information amount of the related information presented may be altered in accordance with a total value of the degrees of attention indicated by the acquired indexes.

According to the aforementioned aspect, in the information processing method, in the case where a plurality of cooking processes are proceeding concurrently, the displayed images are controlled using a total value of the indexes calculated for each of the plurality of cooking processes that are proceeding concurrently. By using a total value of the indexes, a comparatively high index is calculated in the case where a comparatively large number of cooking processes are proceeding concurrently, and, as a result, there is a benefit in that a higher degree of attention can be prompted from the user.

For example, the related information included in the first information may include information indicating a plurality of cooking actions, in the specifying, a plurality of actions of the cook may be specified as actions of the cook, in the determining, it may be determined whether or not the specified plurality of actions of the cook are the plurality of cooking actions, and in the acquiring of the index, an index indicating the largest degree of attention may be acquired as the index, from among indexes indicating degrees of attention of the cook recommended for each of the plurality of cooking actions, in the case where it is determined that the specified plurality of actions of the cook are the plurality of cooking actions.

According to the aforementioned aspect, in the information processing method, in the case where a plurality of cooking processes are proceeding concurrently, the displayed images are controlled using the largest value of the indexes calculated for each of the plurality of cooking processes that are proceeding concurrently. By using the largest value of the indexes, even in the case where a plurality of cooking processes are proceeding concurrently, there is a benefit in that the images displayed can be controlled using an index that is independently calculated from each of the plurality of cooking processes, regardless of the number of cooking processes that are proceeding concurrently.

For example, after the related information having the altered information amount has been output to the presentation device, in the acquiring of the second information, new second information for specifying the form of the action of the cook may be acquired, in the specifying, the action of the cook may be newly specified based on the new second information, in the determining, it may be newly determined whether or not the newly specified action of the cook is the cooking action, in the acquiring of the index, a new index indicating a degree of attention of the cook recommended for the cooking action may be acquired in the case where it is determined that the newly specified action of the cook is the cooking action, and the information processing method may additionally include:

returning the information amount of the related information presented on the presentation device, to the information amount prior to being altered due to the altering, in the case where the degree of attention indicated by the acquired new index is equal to or less than a threshold value; and outputting the related information to the presentation device in order to cause the presentation device to present the related information having been returned to the information amount prior to being altered due to the altering.

According to the aforementioned aspect, in the information processing method, the information amount of the related information presented is returned to the original information amount in the case where a state is no longer in effect in which the degree of attention to be paid by the user is high after the information amount of the related information presented has been reduced. Thus, the user is able to once again return to a state of carrying out cooking while visually confirming the cooking support system.

For example, the second information may include information indicating an operating state of a cooking appliance being used for cooking by the cook, in the specifying, the action of the cook may be specified based on the information indicating the operating state included in the acquired second information, and in the determining, it may be determined whether or not the specified action of the cook is the cooking action.

According to the aforementioned aspect, in the information processing method, more specifically, it is possible for the action of the cook to be specified based on the operating state of the cooking appliance.

For example, in the acquiring of the index, an index indicating a degree of attention of the cook recommended for the cooking action indicated by the first information may be calculated based on the information indicating the operating state included in the acquired second information, and the calculated index may be acquired as the index.

According to the aforementioned aspect, in the information processing method, more specifically, it is possible for the index to be calculated based on the operating state of the cooking appliance.

For example, after the related information having the altered information amount has been output to the presentation device, in the acquiring of the second information, new second information for specifying the form of the action of the cook may be acquired, in the specifying, the action of the cook may be newly specified based on the new second information, in the determining, it may be newly determined whether or not the newly specified action of the cook is the cooking action, in the acquiring of the index, a new index indicating a degree of attention of the cook recommended for the cooking action may be acquired in the case where it is determined that the newly specified action of the cook is the cooking action, and the information processing method may additionally include outputting a warning for the cooking action to the presentation device in order to cause the presentation device to present the warning, in the case where the calculated index and the newly calculated index satisfy a predetermined condition.

According to the aforementioned aspect, in the information processing method, a cooking process that requires the user to perform an urgent countermeasure can be presented to the user. In particular, in the case where a plurality of cooking processes are proceeding concurrently, it is possible to suppress the inappropriate result of the user not being able to direct his or her attention to other cooking processes as a result of his or her attention being excessively directed to a portion of the cooking processes from among the plurality of cooking processes.

Furthermore, an information processing system according to an aspect of the present disclosure includes, using a processor:

a presentation control unit that acquires first information including related information relating to a cooking action to be carried out by a cook, and outputs the related information to a presentation device in order to cause the presentation device to present the related information;

an interface unit that acquires second information for specifying the form of an action of the cook;

a determination unit that specifies the action of the cook, based on the second information, and determines whether or not the specified action of the cook is a cooking action;

an acquisition unit that acquires an index indicating a degree of attention of the cook recommended for the cooking action, in the case where it is determined that the specified action of the cook is the cooking action; and a processing unit that alters an information amount of the related information presented, in accordance with the degree of attention indicated by the acquired index.

Thus, an effect that is similar to that of the aforementioned information processing method is demonstrated.

Furthermore, a terminal according to an aspect of the present disclosure includes, using a processor that carries out information processing:

a presentation device that acquires first information including related information relating to a cooking action to be carried out by a cook, and presents the related information; and an interface unit that acquires second information for specifying the form of an action of the cook, and transmits the second information to a server, in which, in the case where, in the server, it is determined that the action of the cook specified based on the second information is a cooking action, the related information having been altered to have an information amount corresponding to a degree of attention of the cook recommended for the cooking action is transmitted from the server, and the related information having the altered information amount is presented on the presentation device.

According to the aforementioned aspect, an effect that is similar to that of the aforementioned information processing method is demonstrated by the server and the terminal.

It should be noted that general or specific aspects hereof may be realized by a system, a method, an integrated circuit, a computer program, or a recording medium such as a computer-readable CD-ROM, and may be realized by any combination of a system, a method, an integrated circuit, a computer program, or a recording medium.

Hereinafter, embodiments will be described in a specific manner with reference to the drawings.

It should be noted that the embodiments described hereinafter all represent general or specific examples. The numerical values, the shapes, the materials, the constituent elements, the arrangement positions and modes of connection of the constituent elements, the steps, the order of the steps and the like given in the following embodiments are examples and are not intended to restrict the present disclosure. Furthermore, from among the constituent elements in the following embodiments, constituent elements that are not mentioned in the independent claims indicating the most significant concepts are described as optional constituent elements.

Embodiments

In the present embodiment, a cooking support system, a cooking support method, and the like that support a user in carrying out cooking more appropriately are described. Here, "carry out cooking appropriately" is a concept that includes carrying out cooking with no mistakes or failures in such a way that a dish is completed correctly, and carrying out cooking safely in such a way that the user who is carrying out cooking does not harm his or her body. It should be noted that the cooking support system and the cooking support method are examples of an information processing system and an information processing method, respectively.

(Overall View of Service Provided)

First, an overall view of a service provided by a cooking support system in the present embodiment will be described.

Figure 10:
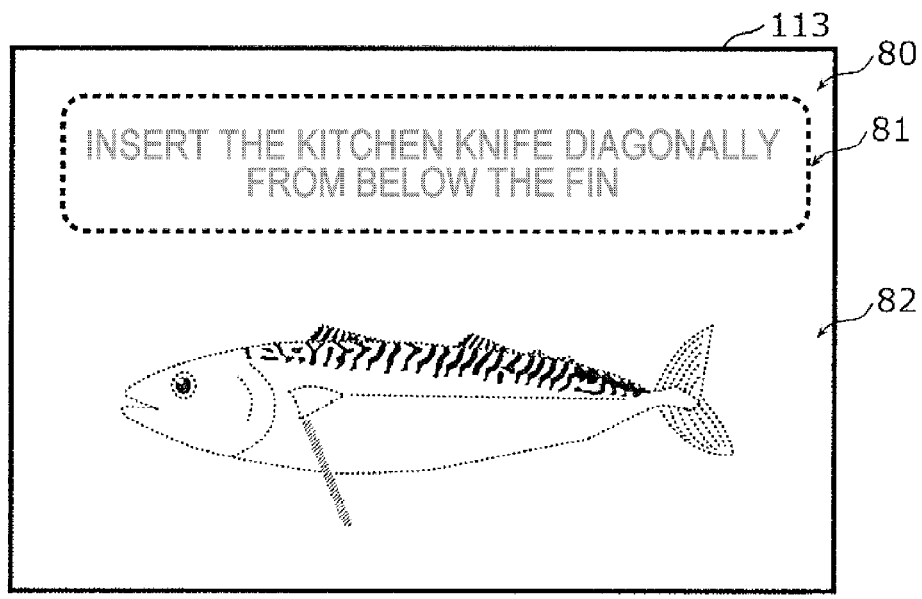
FIG. 10 is an explanatory diagram depicting an example of instruction information including a character string and a drawing in which the colors have been altered, displayed by the display unit according to the embodiment.

FIGS. 1A, 1B, and 10 are explanatory diagrams depicting overall views of a service provided by the cooking support system in the embodiment. The cooking support system is provided with a group 1100, a data center operating company 1110, and a service provider 1120.

The group 1100 is, for example, a corporation, an association, a household, or the like, the scale thereof not being significant. The group 1100 is provided with a plurality of devices 1101 including a first device and a second device, and a home gateway 1102. The plurality of devices 1101 include devices that are capable of connecting to the Internet (for example, smartphones, personal computers (PCs), televisions, or the like), and devices that are not capable of connecting to the Internet by themselves (for example, lights, laundry machines, refrigerators, or the like). The plurality of devices 1101 may also include devices that are not able to connect to the Internet by themselves but are able to connect to the Internet via the home gateway 1102. Furthermore, users 1010 use the plurality of devices 1101 from within the group 1100.

The data center operating company 1110 is provided with a cloud server 1111. The cloud server 1111 is a virtual server that cooperates with various devices via the Internet. The cloud server 1111 manages a huge amount of data (big data) that is difficult to handle mainly with normal database management tools or the like. The data center operating company 1110 manages the data, manages the cloud server 1111, operates a data center that implements the aforementioned, and so forth. Details of the service carried out by the data center operating company 1110 are described later on.

Here, the data center operating company 1110 is not restricted to a company that only manages data or the cloud server 1111. For example, as depicted in FIG. 1B, in the case where a device manufacturer that develops or manufactures one device from among the plurality of devices 1101 manages the data, manages the cloud server 1111, or the like, the device manufacturer corresponds to the data center operating company 1110. Furthermore, the data center operating company 1110 is not restricted to being one company. For example, as depicted in FIG. 10, in the case where a device manufacturer and a management company are managing the data or managing the cloud server 1111 on a joint or shared basis, both or either one of the device manufacturer and the management company correspond to the data center operating company 1110.

The service provider 1120 is provided with a server 1121. The server 1121 referred to here includes, for example, a memory from within a PC for personal use, or the like, the scale thereof not being significant. Furthermore, there are also cases where the service provider 1120 is not provided with the server 1121.

It should be noted that the home gateway 1102 is not essential in the aforementioned cooking support system. For example, the home gateway 1102 is not necessary in the case where the cloud server 1111 carries out all data management, or the like. Furthermore, there are also cases where there are no devices that are not capable of connecting to the Internet by themselves, such as when all of the devices in a household are connected to the Internet.

Next, the flow of information in the aforementioned cooking support system will be described.

First, the first device or the second device of the group 1100 transmits items of log information to the cloud server 1111 of the data center operating company 1110. The cloud server 1111 accumulates the log information of the first device or the second device (arrow 1131 in FIG. 1A). Here, the log information is information indicating, for example, the operating states, operation times and dates, or the like of the plurality of devices 1101. For example, the log information includes the viewing history of a television, the video recording reservation information of a recorder, the operation times and dates of a laundry machine, the amount of laundry, the opening/closing times and dates of a refrigerator, the number of times the refrigerator is opened/closed, or the like. However, the log information is not restricted to such information, and various types of information that can be acquired from various devices may be included. It should be noted that the log information may be provided to the cloud server 1111 directly from the plurality of devices 1101 themselves via the Internet. Furthermore, the log information may be temporarily accumulated in the home gateway 1102 from the plurality of devices 1101, and provided to the cloud server 1111 from the home gateway 1102.

Next, the cloud server 1111 of the data center operating company 1110 provides the accumulated log information to the service provider 1120 in fixed units. Here, these fixed units may be units with which it is possible for the data center operating company 1110 to organize and provide the accumulated information to the service provider 1120, or units requested by the service provider 1120. Furthermore, here the log information is provided in fixed units; however, fixed units do not have to be used, and the amount of information that is provided may vary according to the situation. The log information is saved in the server 1121 possessed by the service provider 1120 as required (arrow 1132 in FIG. 1A).

Then, in the service provider 1120, the log information is organized into information that conforms with a service to be provided to users, and is provided to the users. The users to whom the information is provided may be the users 1010 who use the plurality of devices 1101, or may be external users 1020. As a method for providing information to the users 1010 and 1020, for example, the information may be provided to the users 1010 and 1020 directly from the service provider 1120 (arrows 1133 and 1134 in FIG. 1A). Furthermore, as a method for providing information to the users 1010, for example, the information may be provided to the users 1010 by once again going through the cloud server 1111 of the data center operating company 1110 (arrows 1135 and 1136 in FIG. 1A). Furthermore, the cloud server 1111 of the data center operating company 1110 may organize the log information into information that conforms with the service to be provided to the users, and may provide the information to the service provider 1120.

It should be noted that the users 1010 may be the same as or different from the users 1020.

Hereinafter, a cooking support system according to the present embodiment will be described.
[Configuration of Cooking Support System]

Figure 2:
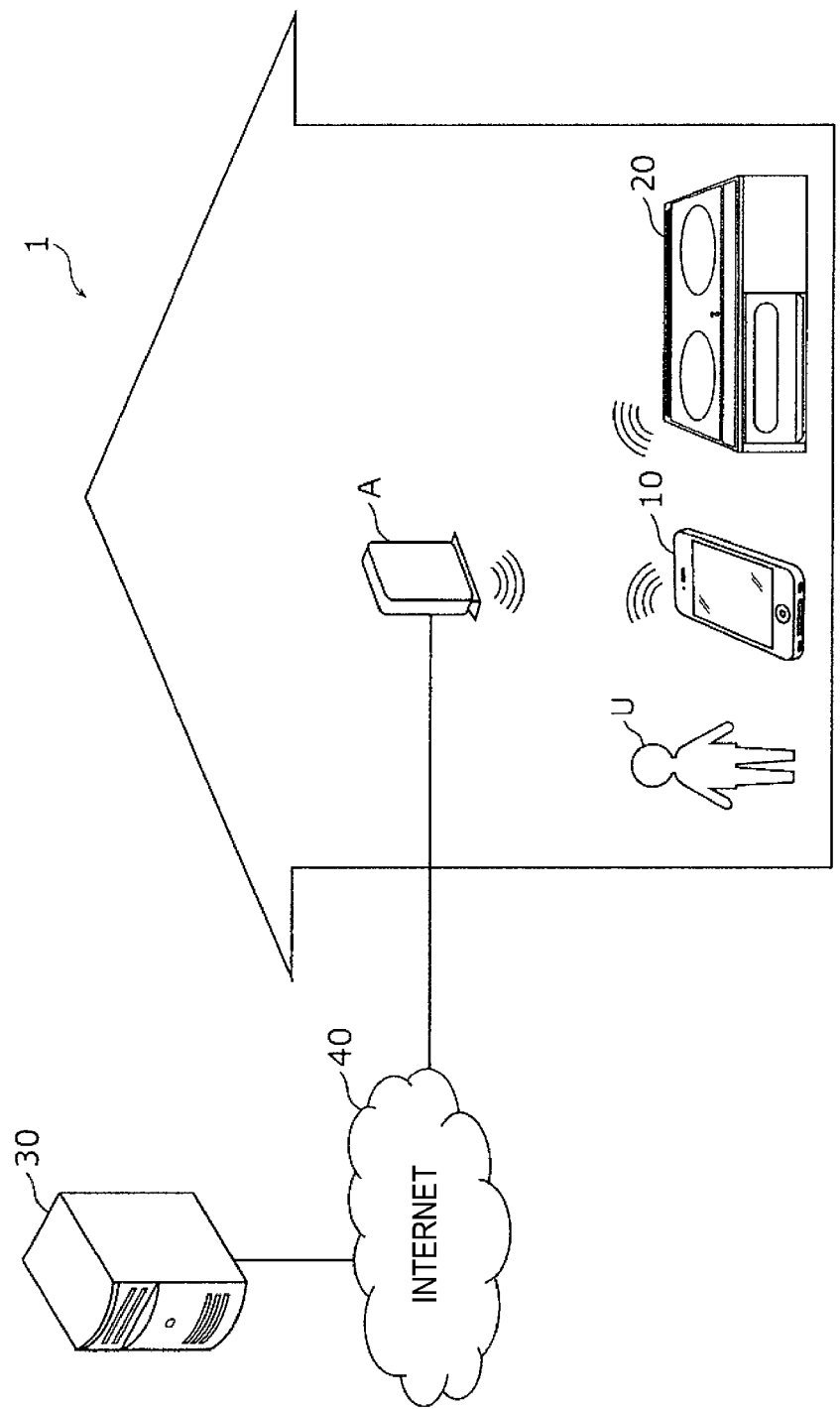
FIG. 2 is a schematic diagram depicting a configuration of the cooking support system according to the embodiment.

FIG. 2 is a schematic diagram depicting a configuration of a cooking support system 1 according to the present embodiment.

As depicted in FIG. 2, the cooking support system 1 according to the present embodiment is provided with a terminal 10, a cooking appliance 20, and a server 30. The terminal 10, the cooking appliance 20, and the server 30 are communicably connected to each other via a network. The network, for example, includes a wireless LAN or the like constructed using the Internet 40 and a base station A that is connected to the Internet 40; however, the network is not restricted thereto, and may include a cellular telephone network, a satellite communication network, a wired LAN, Bluetooth (registered trademark), or the like.

The terminal 10 is a terminal device that manages a cooking process required for a dish to be created by a user U who is a cook, and presents a cooking action to be carried out by the user U in accordance with the progress of the cooking process. It is assumed that the terminal 10 is arranged in a location where information can be presented to the user U who is carrying out cooking. The terminal 10 is equipped with a wireless LAN interface, and is able to establish a wireless communication link with the base station A and communicate with the server 30 and the cooking appliance 20 through this wireless communication link. The terminal 10, for example, is constituted by various types of terminal devices such as a smartphone, a tablet, a personal computer, or the like.

The cooking appliance 20 is a device that is used for the user U to carry out a cooking action. The cooking appliance 20 is equipped with a wireless LAN interface, and is able to establish a wireless communication link with the base station A and communicate with the server 30 through this wireless communication link. The cooking appliance 20, for example, is a cooking appliance such as an IH cooking heater, a microwave oven, or a grill, or is a kitchen knife equipped with an acceleration sensor or the like. Hereinafter, the case where the cooking appliance 20 is an IH cooking heater will be described as an example.

The server 30 is a server that retains a recipe including a series of cooking processes required for the dish, and distributes the recipe as required. The server 30 is connected to the Internet 40 by means of a network interface, and is able to communicate with the terminal 10. It should be noted that the server 30 may be arranged in any location as long as the server 30 is able to communicate with the terminal 10 via the Internet 40.

Here, the terminal 10 and the cooking appliance 20 depicted in FIG. 2 correspond to the devices 1101 depicted in FIG. 1A and the like, and the server 30 corresponds to the cloud server 1111 or the server 1121 depicted in FIG. 1A and the like.

Hereinafter, a specific configuration of each of the terminal 10, the cooking appliance 20, and the server 30 will be described.

It should be noted that the term "cooking process" means a stage of cooking that is carried out up to the dish being completed, and, specifically, there is a cooking process in which an ingredient is cut, a cooking process in which water is boiled, and the like.

Furthermore, the term "cooking action" means an action that is actually carried out by the user U who is the cook, and there is the action of cutting an ingredient, the action of boiling water, and the like. These actions are, respectively, actions carried out by the user U in a cooking process in which an ingredient is cut and a cooking process in which water is boiled.

Figure 3:
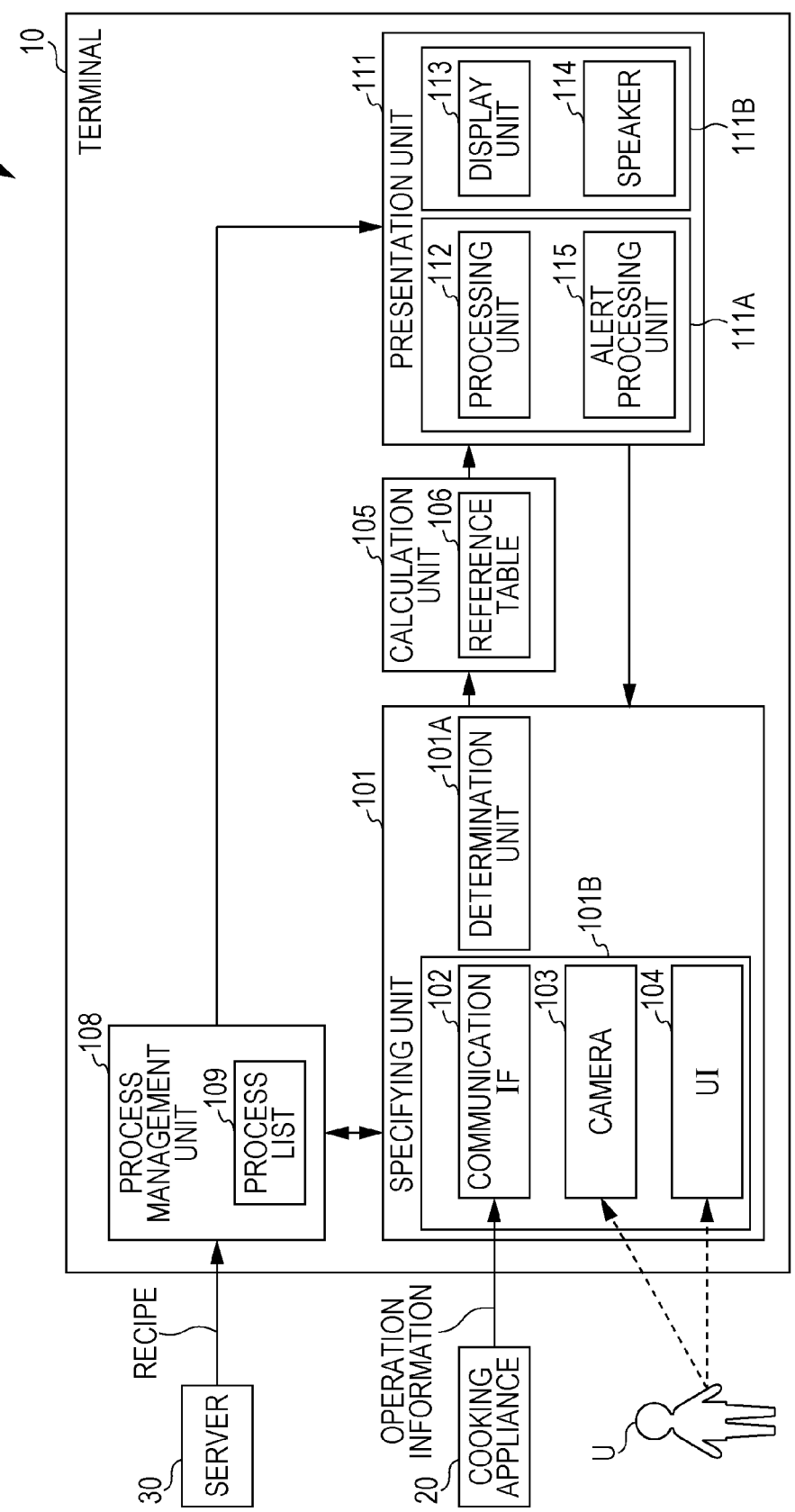
FIG. 3 is a block diagram depicting a functional configuration of the cooking support system according to the embodiment.

FIG. 3 is a block diagram depicting a functional configuration of the cooking support system 1 according to the present embodiment.
[Configuration of Terminal 10]

The terminal 10 is provided with a specifying unit 101, a calculation unit 105 corresponding to an acquisition unit, a process management unit 108, and a presentation unit 111.

The specifying unit 101 is a processing unit that specifies a cooking action being carried out by the user U. The specifying unit 101, for example, acquires information indicating a cooking action that is included in an entry in a process list 109 described later on, and acquires information specifying the form of an action of the cook. Information indicating a cooking action may be acquired from the process management unit 108 described later on, or information indicating a cooking action included in an entry that has been output by the process management unit 108 to the presentation unit 111 may be acquired from the presentation unit 111. Furthermore, the information specifying the form of an action of the cook is also referred to as second information.

On the basis of the second information, the specifying unit 101 specifies an action of the user U, and determines whether or not the specified action is a cooking action that is indicated in the acquired information.

For example, when having determined that the specified action is the aforementioned cooking action, the specifying unit 101 specifies that the action of the user is the aforementioned cooking action, and outputs the specified cooking action to the calculation unit 105. For the determination as to whether or not the aforementioned cooking action is being carried out by the user U, a determination as to whether or not the action of the user U matches the aforementioned cooking action, a determination as to whether or not the cooking action has been started by the user U, and a determination as to whether or not the cooking action has ended are carried out.

More specifically, the specifying unit 101 includes a determination unit 101A and an interface unit 101B, for example. The interface unit 101B acquires and outputs the aforementioned second information to the determination unit 101A. The determination unit 101A acquires the second information from the interface unit 101B. The interface unit 101B is provided with one or more from among a communication IF 102, a camera 103, and a UI 104, for example. To acquire information necessary to specify a cooking action, one or more from among the communication IF 102, the camera 103, and the UI 104 are combined and used, for example.

Furthermore, the presentation unit 111 specifies the action of the user U on the basis of the second information. The action of the user U may be specified based on operation information of the cooking appliance 20, for example, or may be specified based on an image of the user U captured by the camera 103.

The determination unit 101A determines whether or not the action of the user U specified based on the second information is the aforementioned cooking action. For example, when having determined that the cooking action is being carried out by the user U, the determination unit 101A specifies that the aforementioned cooking action is being carried out by the user U, and notifies the calculation unit 105 that the aforementioned specifying has been carried out.

For example, the determination unit 101A may specify an action of the user U on the basis of operation information of the cooking appliance 20 acquired via the communication IF (interface) 102 from the cooking appliance 20. Here, operation information of the cooking appliance 20 is information indicating an operation of the cooking appliance 20, and, in the case where the cooking appliance 20 is an IH cooking heater, is information indicating the heating power of the IH cooking heater (for example, low, medium, or high) and the temperature on a top plate. The determination unit 101A then determines the cooking action on the basis of the acquired operation information. For example, in the case where the acquired operation information indicates that the heating power is "medium", the determination unit 101A may specify that the cooking action of boiling water in a pot is being carried out by the user U.

Also, in the case where the cooking action indicated by an entry indicates boiling water, the determination unit 101A determines that the specified action of the user U is the cooking action. The determination unit 101A determines that the aforementioned cooking action has started when having first determined that the specified action of the user U is the cooking action.

Thereafter, for example, in the case where it is indicated in the acquired operation information that the heating power has been stopped, it can be specified that the cooking action of water being boiled by the user U has ended. In this case, the determination unit 101A determines that the specified cooking action of the user U has ended. Furthermore, the determination unit 101A determines that the cooking action is in the middle of being carried out, between determining that the cooking action has started and determining that the cooking action has ended.

For example, the determination unit 101A may specify the action of the user U on the basis of an image of the user U captured by the camera 103. The determination unit 101A may then specify the action of the user U by recognizing a behavior of the user U using image recognition processing technology. The captured image of the user U may be a moving image or may be a still image; however, taking into consideration that the behavior of the user U is to be recognized, it can be expected that using a moving image enables more accurate recognition to be carried out. For example, in the case where the acquired image is an image depicting a scene in which the user U has arranged a pot on the top plate of the IH cooking heater, the specifying unit 101 may specify that the cooking action of boiling water in a pot is being carried out by the user U. It should be noted that the aforementioned image recognition processing technology, specifically, includes recognition processing by means of background difference extraction processing, template matching based on images in which the user U who is carrying out the cooking action has been captured, or the like.

The determination unit 101A receives the cooking action being carried out by the user U, by means of the user interface (UI) 104, for example. In this case, for example, the presentation unit 111 displays a plurality of candidates for cooking actions that may be carried out by the user U ("cut into thin strips with a kitchen knife", "boil water in a pot", or the like), and a designation made by the user U with respect to the plurality of displayed candidates is received by the UI 104.

For example, in the case where the cooking appliance 20 is a kitchen knife equipped with an acceleration sensor and a communication circuit, it is also possible for the specifying unit 101 to specify that a cooking process in which the kitchen knife is used (a process in which an ingredient is cut, such as cutting a cabbage into thin strips, for example) has started or ended, on the basis of the pattern of changes in acceleration values for the acceleration of the kitchen knife received by the communication IF 102 at predetermined time intervals from the communication circuit.

It should be noted that, although the drawings depict that the interface unit 101B of the specifying unit 101 is provided with the communication IF 102, the camera 103, and the UI 104, there is no restriction thereto. For example, the interface unit 101B may be provided with any of the communication IF 102, the camera 103, and the UI 104. Alternatively, the specifying unit 101 may acquire an image acquired by an external camera without being provided with the interface unit 101B, and the image acquired by the camera 103 may be used to specify an action of the user.

The calculation unit 105 is a processing unit that calculates an index indicating the degree of attention to be paid by the user U in the cooking process specified by the specifying unit 101. The calculation unit 105 has a memory, for example, and stores predetermined data in the memory. The memory is a writable recording medium, and, for example, is a hard disk, a semiconductor memory, or the like. The calculation unit 105 calculates the aforementioned index by referring to the predetermined data stored in the memory. As the data, for example, a reference table 106 indicating associations between the cooking appliance 20 and cooking actions, and indexes can be adopted. Furthermore, as the data, additionally, a reference table 107 indicating associations between temperatures of the cooking appliance 20 and indexes can also be adopted. The reference tables 106 and 107 will be described in detail later on. It should be noted that the reference table 106 and the like are described using eXtensible Markup Language (XML), for example, but there is no restriction thereto.

A specific example of the aforementioned index is an index indicating the possibility of the body of the user U being harmed due to a reason such as using a sharp cutting tool or a high-temperature object in a cooking action. Furthermore, another specific example is an index indicating the degree of necessity or urgency of a countermeasure by the user U in a case such as when a pot has boiled over in a cooking action. It should be noted that it is also possible to adopt an index obtained by combining both of the aforementioned two indexes with the sum or the product of the aforementioned two indexes being taken, the largest value of the aforementioned two indexes being taken, or the like. In other words, in the case it has been specified in the specifying unit 101 that a plurality of cooking actions are being carried out at the present point in time, the calculation unit 105 may calculate, as an index, a total value of indexes indicating the degree of attention to be paid by the cook to each of the plurality of specified cooking processes. Furthermore, in the case it has been specified that a plurality of cooking actions are being carried out at the present point in time, the calculation unit 105 may calculate, as an index, the largest value of the indexes indicating the degree of attention to be paid by the cook to each of the plurality of specified cooking actions.

More specifically, for example, it is assumed that in the specifying unit 101 it has been determined that two cooking actions included in one entry in the process management unit 108 described later on are presently being carried out by the user U. One of the two determined cooking actions is taken as a first cooking action and the other is taken as a second cooking action. In this case, the calculation unit 105 may acquire a first index indicating the degree of attention to be paid by the cook to the first cooking action, and a second index indicating the degree of attention to be paid by the cook to the second cooking action, from the reference table 106, and may calculate a third index, which is calculated using the first and second indexes, as the aforementioned index.

The third index may be the sum or the product of the first index and the second index, for example. Alternatively, the third index may be the index having the larger degree of attention to be paid by the cook from among the first index and the second index, for example.

It should be noted that the index may be increased/decreased and adjusted in accordance with the proficiency level of the user U, with a predetermined value serving as a reference. The proficiency level may be determined from a use period from the user U starting to use the cooking support system 1, or may be determined by means of input performed by the user U.

The process management unit 108 is a processing unit that manages a cooking process for a dish to be cooked by the user U. The process management unit 108 has a memory, for example, acquires a duplicate of some or all of a recipe retained by the server 30, and stores this in the memory. A process list for the dish that the user U is about to create or is creating is created and provided to the presentation unit 111. The memory is a writable recording medium, and, for example, is a hard disk, a semiconductor memory, or the like.

The presentation unit 111, for example, acquires an entry corresponding to a cooking process to be carried out by the user U from the process management unit 108. The entry is also referred to as first information. The entry includes related information relating to a cooking action to be carried out by the user U. More specifically, for example, the related information included in the entry includes information indicating a cooking action to be carried out by the user U in the cooking process, and instruction information for instructing the cooking action to the user, for example. The presentation unit 111, furthermore, presents the related information included in the entry to the user. Furthermore, the presentation unit 111 processes the related information being presented. Furthermore, the presentation unit 111 presents an alert in the case where it has become necessary for the user U to perform an urgent countermeasure, while presenting the related information. In the description hereinafter, an example will be described in which the presentation unit 111 presents instruction information to the user as related information, and processes the presented instruction information. Furthermore, the presentation unit 111 may output information indicating a cooking action to be carried out by the user U included in an entry, to the specifying unit 101. It should be noted that information indicating a cooking action to be carried out by the user U may be presented to the user as related information, and the presented information may be processed.

More specifically, the presentation unit 111 includes a presentation control unit 111A and a presentation device 111B, for example. The presentation control unit 111A, for example, acquires the aforementioned entry and causes the presentation device 111B to present instruction information included in the acquired entry.

The presentation device 111B, for example, includes a display unit 113 corresponding to a display device, and a speaker 114. The display unit 113 is a display or a projector. In the case where the display unit 113 is a display, the instruction information is presented to the user U by the instruction information being displayed on the display as an image. In the case where the display unit 113 is a projector, the instruction information is presented to the user U by the instruction information being projected as an image. The speaker 114 presents the instruction information to the user U by outputting the instruction information as a sound or speech.

Here, a description will be given with a display serving as an example of the display unit 113. Content has been described in which the presentation control unit 111A causes a display corresponding to the display unit 113 to display images included in instruction information; however, there is no restriction thereto. For example, in the case where the display unit 113 is a projector, it is sufficient as long as the projector corresponding to the display unit 113 is made to project the aforementioned images. In this case, the projector projects the aforementioned images onto a workbench or the like being used for cooking by the user U, for example.

Furthermore, the presentation control unit 111A may present the instruction information to the user U by causing speech data included in the instruction information to be output to the speaker 114 and to be output from this speaker 114 as speech.

Furthermore, the presentation control unit 111A includes a processing unit 112 and an alert processing unit 115, for example. The processing unit 112 processes the instruction information being presented by the presentation device 111B, for example. The information amount of the instruction information is altered according to the processing of the instruction information. The alert processing unit 115 causes the presentation device 111B to present an alert in the case where it has become necessary for the user U to perform an urgent countermeasure while the presentation device 111B is presenting the instruction information, for example.

The processing unit 112 is a processing unit that processes the instruction information as mentioned above. The processing unit 112 carries out processing to reduce the information amount of the instruction information being presented by the presentation unit 111 (the display unit 113), in the case where the degree of attention indicated by the index calculated by the calculation unit 105 is greater than a threshold value. Here, the information amount means an amount of information, and, specifically, includes the number of characters included in information, the size of an image, the difference in the tints of the colors included in an image, the volume of a sound, and the number of information types (character, image, or sound).

More specifically, the processing unit 112 acquires an image that constitutes instruction information being presented by the presentation unit 111 (the display unit 113), and processes the acquired image in the case where the index calculated by the calculation unit 105 is greater than a first threshold value corresponding to the aforementioned threshold value. The method for processing the image is as indicated hereinafter, for example. It should be noted that a pre-processed image is also referred to as a normal image, and a processed image is also referred to as a suppressed image.

For example, the processing unit 112 carries out processing to maintain a portion of the images being displayed by the display unit 113 and to delete the remainder. The processing unit 112 causes the display unit 113 to display a suppressed image corresponding to the processed image, as instruction information. Thus, the display of a portion of the images that were being displayed as instruction information on the display unit 113 is maintained and the remainder are not displayed, thereby reducing the information amount of the instruction information displayed on the display unit 113. Furthermore, the normal image and the suppressed image, for example, may be retained in a memory that is not depicted, for example.

For example, the processing unit 112 carries out processing to delete a portion of a normal image being displayed by the display unit 113. Thus, the information amount is reduced by not displaying a portion of the normal image being displayed by the presentation unit 111, rather than displaying the entirety of the normal image.

For example, the processing unit 112 may carry out processing to delete the entirety of the normal image being displayed by the display unit 113. At such time, in order to cause speech corresponding to the instruction information to be output from the speaker 114, the processing unit 112 may additionally output speech data that includes this speech to the speaker 114.

Furthermore, processing to alter a color of an image displayed by the presentation unit 111 may be carried out. In addition, the aforementioned processing may be combined.

The alert processing unit 115 is a processing unit that presents a warning in the case where it is assumed to be necessary for the user U to perform an urgent countermeasure with respect to a cooking action. The case where it is assumed to be necessary to perform an urgent countermeasure is, for example, the case where a pot has boiled over when the cooking action of boiling water is being carried out, or the like. It should be noted that the alert processing unit 115 is not an essential configuration in the cooking support system 1.

Specifically, the alert processing unit 115 presents a warning in the case where the index indicating the degree of attention to be paid by the user U to a cooking action being carried out by the user U satisfies a condition indicating that it is necessary for the user U to perform an urgent countermeasure. For this condition, for example, the index having exceeded a second threshold value that is larger than the aforementioned first threshold value, or the index having sharply increased, that is, the range of increase of the index within a fixed time having become greater than a predetermined value, can be adopted.

It should be noted that presenting a warning exhibits a greater effect when the user U is carrying out a plurality of cooking processes concurrently. In other words, in the case where a plurality of cooking processes being carried out at the present point in time have been specified, and any of the indexes indicating the degree of attention to be paid by the cook to the respective plurality of specified cooking actions satisfies the condition indicating that it is necessary for the user U to perform an urgent countermeasure, the alert processing unit 115 presents a warning indicating the cooking process pertaining to the index having satisfied the condition. In this way, the alert processing unit 115 is able to notify the user U that it has become necessary to perform an urgent countermeasure for any of the plurality of cooking actions being carried out by the user U.

It should be noted that the display unit 113 and the UI 104 may be configured as a single unit as a touch panel display.

Figure 4:
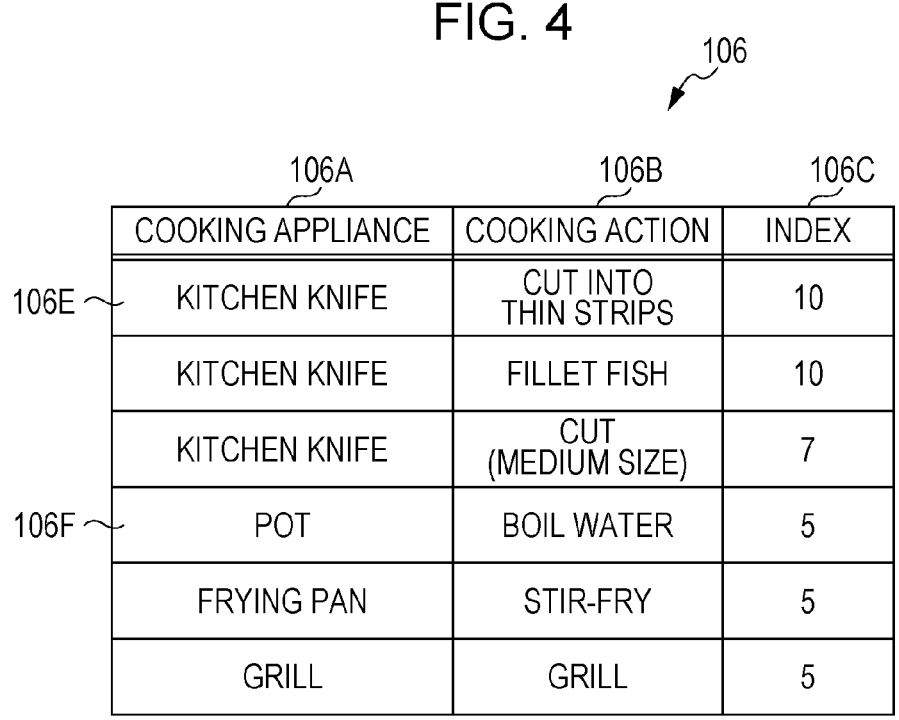
FIG. 4 is an explanatory diagram depicting a reference table indicating associations between cooking appliances and cooking actions, and indexes according to the embodiment.

FIG. 4 is an explanatory diagram depicting the reference table 106 indicating associations between the cooking appliance 20 and cooking actions, and indexes according to the present embodiment. The reference table 106 depicts indexes indicating the degree of attention to be paid to a cooking subject by the user U when the user U carries out a cooking action using the cooking appliance 20. One entry (one row) in the reference table 106 corresponds to one cooking action. The reference table is retained in a memory.

As depicted in FIG. 4, the reference table 106 has the items of a cooking appliance 106A, a cooking action 106B, and an index 106C for each entry in the reference table 106.

The cooking appliance 106A is information indicating the cooking appliance 20 that is used in order to carry out the cooking action of the entry in question.

The cooking action 106B is information indicating the cooking action of the entry in question.

The index 106C is information indicating an index that indicates the degree of attention to be paid to a cooking subject when the user U carries out the cooking action of the entry in question using the cooking appliance 106A of the entry in question. The cooking subject, for example, is an ingredient that is to be cooked, or an instrument that is to be used when cooking the ingredient. The instrument may also be referred to as a cooking appliance. The index 106C, for example, may be an index indicating to which level a degree of attention belongs in the case where the degree of attention is evaluated in 10 levels ("10" indicating the highest degree of attention and "1" indicating the lowest). This case will be described hereinafter; however, this number of levels and the like are an example.

For example, an entry 106E in the reference table 106 signifies that when the user U is to cut an ingredient into thin strips using a kitchen knife, the degree of attention to be paid by the user U to the ingredient or the kitchen knife is 10. Furthermore, an entry 106F in the reference table 106 signifies that when the user U is to boil water using a pot, the degree of attention to be paid by the user U to the ingredient or the pot is 5. A description of the other entries has been omitted.

The calculation unit 105 refers to the reference table 106, acquires the index 106C associated with a cooking action specified by the specifying unit 101, and calculates an index on the basis of the acquired index 106C. In the case where there is one cooking action specified by the specifying unit 101, the index 106C associated with the specified cooking action becomes the index to be calculated. The calculation unit 105 outputs the calculated index to the presentation unit 111, or more specifically, to the presentation control unit 111A.

In the reference table 106, the case where one cooking action corresponds to one index is depicted as an example; however, it should be noted that one cooking action may correspond to any of a plurality of indexes in accordance with the detailed state of the cooking action. An example of this case will be described with reference to FIG. 5.

Figure 5:
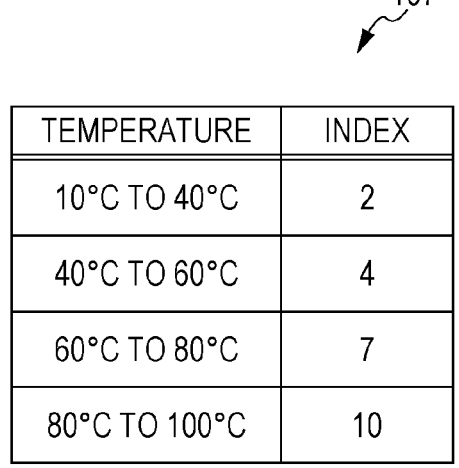
FIG. 5 is an explanatory diagram depicting a reference table indicating associations between temperatures of a cooking appliance and indexes according to the embodiment.

FIG. 5 is an explanatory diagram depicting the reference table 107 indicating associations between temperatures of the cooking appliance 20 and indexes according to the present embodiment. It should be noted that the temperature of the cooking appliance 20, for example, is the temperature of the top plate of an IH cooking heater constituting the cooking appliance 20.

The reference table 107 depicts indexes indicating the degree of attention to be paid by the user U for each temperature of the pot when the user U boils water using the pot.

For example, the index for when the temperature of the pot is 10° C. to 40° C. is 2. This is because, in this case, it is assumed that the user U is unlikely to burn himself or herself by touching the pot, and it is thought that there is no possibility of the pot boiling over. Meanwhile, the index for when the temperature of the pot is 80° C. to 100° C. is 10. This is because, in this case, there is a risk of the user U burning himself or herself when touching the pot, and it is thought that there is a possibility of the pot boiling over. Also, the indexes for when the temperature of the pot is 40° C. to 60° C. and 60° C. to 80° C. are determined as values that increase as the temperature increases (4 and 7, respectively). It should be noted that each temperature interval may be further subdivided, and indexes obtained by further subdividing the indexes may be associated with each of the subdivided temperature intervals.

The calculation unit 105 refers to the reference table 107 in addition to the reference table 106, and is thereby able to calculate an index on the basis of not only the cooking action but also the operating state of the cooking appliance 20.

FIG. 6 is an explanatory diagram depicting the process list 109 of cooking processes according to the present embodiment. The process list 109 depicted in FIG. 6 is an example of a process list retained by the process management unit 108, for when the user U is to create "mackerel grilled with salt" and "miso soup" as a dish.

The process list 109 has entries corresponding to each cooking process in the order in which the cooking processes proceed. Each entry is also referred to as first information. Each entry, for example, includes the items of information of a process ID 109A, a dish name 109B, a cooking appliance 109C, a cooking action 109D, a cooking instruction 109E, and an image Uniform Resource Locator (URL) 109F indicating a storage location of an image corresponding to the cooking instruction 109E, as related information relating to a cooking action to be carried out by the user U. Furthermore, an image corresponding to the cooking instruction 109E may be included instead of the image URL 109F. Furthermore, each entry may also include speech data corresponding to content instructed by the cooking instruction 109E.

The process list 109 depicted in FIG. 6 indicates an example in which one item of each of the process ID 109A, the dish name 109B, the cooking appliance 109C, the cooking action 109D, the cooking instruction 109E, and the image URL 109F is included in one entry; however, it should be noted that there is no restriction thereto. For example, a plurality of items of information corresponding to each of the dish name 109B, the cooking appliance 109C, the cooking action 109D, the cooking instruction 109E, and the image URL 109F may be included in one entry.

More specifically, for example, information regarding two cooking appliances may be included in the cooking appliance 109C of one entry. In this case, information indicating a cooking action using one of the aforementioned two cooking appliances and information indicating a cooking action using the other may be included in the cooking action 109D. Furthermore, information indicating a cooking instruction corresponding to one of the items of the aforementioned information indicating two cooking actions and information indicating a cooking instruction corresponding to the other may be included in the cooking instruction 109E. Furthermore, an image URL corresponding to one of the aforementioned two cooking instructions and an image URL corresponding to the other may be included in the image URL 109F.

When the entries in the process list 109 are described as examples, the entry corresponding to process ID 4 and the entry corresponding to process ID 5 may serve as one entry. In this case, a plurality of items of information corresponding to each of the dish name 109B, the cooking appliance 109C, the cooking action 109D, the cooking instruction 109E, and the image URL 109F of this entry may be included. In a case such as this, "miso soup" is included as the dish name for the dish name 109B of this entry. Furthermore, "kitchen knife" and "pot" are included for the cooking appliance 109C of this entry. Furthermore, "cut (medium size)" corresponding to a cooking action using the "kitchen knife" and "boil water" corresponding to a cooking action using the "pot" are included for the cooking action 109D of this entry. Furthermore, "cut tofu into small cubes" as a cooking instruction corresponding to the cooking action "cut (medium size)" and "pour 300 cc of water into the pot, add the tofu, and bring to the boil" as a cooking instruction corresponding to the cooking instruction "boil water" are included for the cooking instruction 109E of this entry. Furthermore, "https:example.com/movie/ey0.png" as an image URL corresponding to the cooking instruction "cut tofu into small cubes" and "https:example.com/movie/ey1.png" as an image URL corresponding to the cooking instruction "pour 300 cc of water into the pot, add the tofu, and bring to the boil" are included for the image URL 109F of this entry.

In this way, the case where the entry corresponding to process ID 4 and the entry corresponding to process ID 5 are taken as one entry means that the plurality of cooking processes to be carried out in the entry corresponding to process ID 4 and the entry corresponding to process ID 5 are to be carried out concurrently by the cook.

This is because a predetermined time is required to boil water, and there is therefore a benefit in that time is saved if the tofu is cut into small cubes and placed in the pot while the water is being boiled in the pot.

In the aforementioned example, an example has been described in which two entries having the same dish name indicated in the dish name 109B are brought together into one entry; however, there is no restriction thereto. Two entries having different dish names indicated in the dish name 109B may be brought together into one entry.

The process ID 109A is identification information with which a cooking process corresponding to the entry in question can be uniquely identified. The process ID 109A may have any form as long as it is information with which each cooking process can be uniquely identified; however, if a numerical value that increases in the order of the progress of the processes is used, there is a benefit in that a function indicating the order of the cooking processes can be combined. Hereinafter, the case where a numerical value that increases in the order of the progress of the processes is used as the process ID 109A will be described as an example.

The dish name 109B is information indicating the name of a dish to which the cooking process corresponding to the entry in question belongs.

The cooking appliance 109C is information indicating the cooking appliance 20 that is used in the cooking process corresponding to the entry in question.

The cooking action 109D is information indicating a cooking action to be carried out by the user U in the cooking process corresponding to the entry in question.

The cooking instruction 109E is text for causing the user U to carry out the cooking action 109D to be performed in the cooking process corresponding to the entry in question or an image corresponding to this text. This text is displayed on the presentation unit 111.

The image URL 109F is a URL for image data that depicts a scene of the cooking process corresponding to the entry in question. The image may be a moving image or may be a still image. Furthermore, data written in a document description language such as HyperText Markup Language (HTML) may be used as the image data. Using a document description language has a benefit in that the processing of instruction information by the processing unit 112 can be facilitated. This is because the processing of instruction information can be carried out by only altering text information, without using image processing.

It should be noted that an upper limit for the degree of attention to be paid by the user U to each region of the image in question may be set in the image data indicated by the image URL 109F. A predetermined value can be used for the upper limit for the degree of attention to be paid by the user U to each region of the image. It should be noted that, in the case where the image is described using HTML, the upper limit for the degree of attention to be paid by the user U to each region of the image can be described as an attribute of an HTML tag.

The instruction information presented on the presentation device 111B by the presentation unit 111 includes text for instructing the cooking action indicated in the cooking instruction 109E or an image corresponding to this text, and the image indicated in the image URL 109F, for example.

It should be noted that the entries included in the process list 109 can be created by appropriately combining cooking processes included in recipes for dishes to be created by the user U ("mackerel grilled with salt" and "miso soup" in this example) from among recipes for dishes retained by the process management unit 108.

Furthermore, the entries included in the process list 109 have been created on the premise that once one cooking process has ended the next cooking process will be carried out; however, a process list in which a plurality of cooking processes are carried out concurrently may also be adopted. For example, a cooking process in which water is boiled (process ID=5) and a cooking process in which a mackerel is filleted (process ID=1) may be carried out concurrently. This is because a predetermined time is required to boil water, and there is therefore a benefit in that time is saved when this time is used to carry out another cooking process. In this case, in the process list 109, the entry corresponding to the cooking process in which water is boiled (process ID=5) and the cooking process in which a mackerel is filleted (process ID=1) may be created as one entry.

Figure 7:
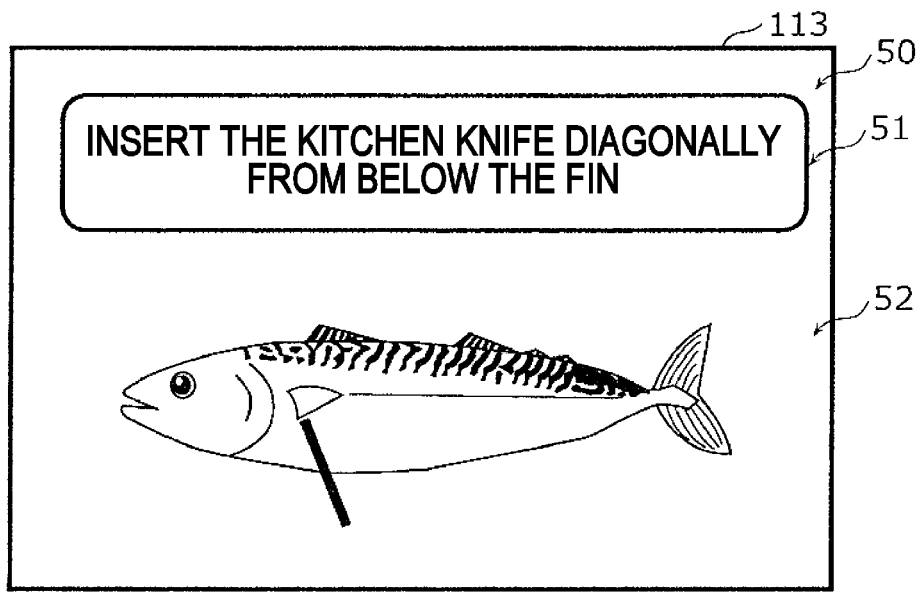
FIG. 7 is an explanatory diagram depicting an example of instruction information including a character string and a drawing, displayed by a display unit according to the embodiment.

FIG. 7 is an explanatory diagram depicting an example of instruction information including a character string and a drawing, displayed by the display unit 113 according to the present embodiment. An image 50 depicted in FIG. 7 is an image corresponding to instruction information for instructing a cooking action included in the entry corresponding to the cooking process having process ID 1, from within the process list 109 depicted in FIG. 6. It should be noted that the image depicted in FIG. 7 is an example of a normal image. For example, the presentation control unit 111A causes the display unit 113 to display the image corresponding to the instruction information. The presentation control unit 111A, for example, generates images including a first image corresponding to a character string for instructing the cooking action and a second image corresponding to an image of an ingredient to be cooked by means of the cooking action, and causes the display unit 113 to display the generated images. The first image and the second image are images that are specified and acquired from the image URL 109F corresponding to the aforementioned entry, for example. These images may be acquired from the aforementioned image URL 109F by the process management unit 108. In this case, the presentation control unit 111A receives the entry and these images from the process management unit 108. Alternatively, the presentation control unit 111A may acquire the first image and the second image using the image URL 109F included in the entry received from the process management unit 108.

The images including the first image and the second image generated by the presentation control unit 111A may be retained in a memory that is not depicted. Furthermore, the first image and the second image may be included in advance in the aforementioned entry.

The image 50 depicted in FIG. 7 is an image that corresponds to instruction information. An image 51 corresponding to a character string stating "insert the kitchen knife diagonally from below the fin" indicating how to make an incision with a kitchen knife when filleting a mackerel, and an image 52 in which a line segment indicating how to make an incision with a kitchen knife has been drawn superimposed on an image of a mackerel are displayed on the display unit 113 as the first image and the second image, respectively. Furthermore, the image 50 is generated by the presentation control unit 111A. Furthermore, the generated image 50 may be retained in a memory that is not depicted.

The user U visually confirms the image 51 and the image 52 included in the image 50, and thereby recognizes a cooking action to be carried out in the cooking process to be carried out from thereon.

However, a relatively large amount of characters and images are included in the image 50, and therefore there is a possibility that the user U may make an incision with a kitchen knife into the actual mackerel at hand that is the cooking subject, while visually confirming the image 51 and the image 52 included in the image 50 displayed on the display unit 113. As a result, there is a risk of the user U being preoccupied with the display unit 113, handling the kitchen knife without looking carefully at the mackerel that is the cooking subject, and injuring his or her hand.

Figure 8:
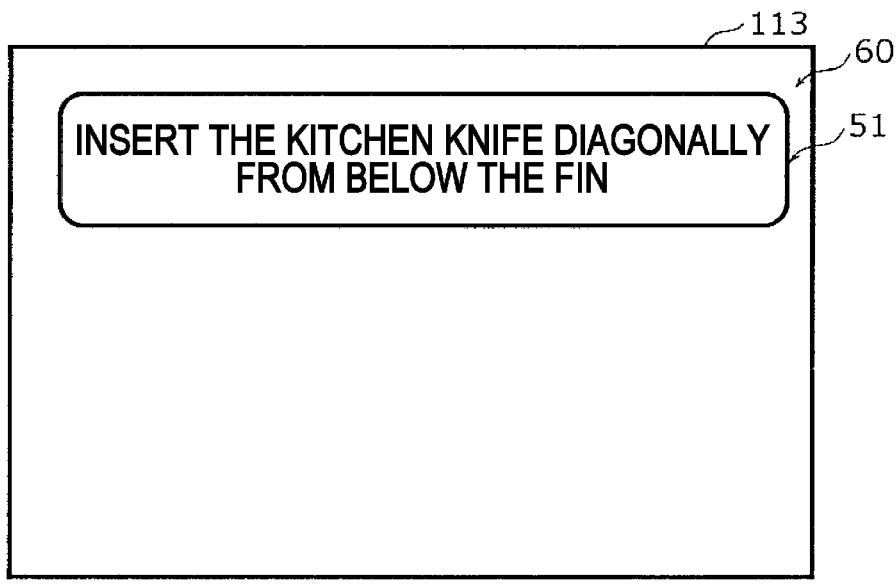
FIG. 8 is an explanatory diagram depicting an example of instruction information including a character string, displayed by the display unit according to the embodiment.

FIG. 8 is an explanatory diagram depicting an example of instruction information including a character string, displayed by the display unit 113 according to the present embodiment. An image 60 depicted in FIG. 8 is an example of an image obtained by the processing unit 112 processing the image 50 of FIG. 7. It should be noted that the image depicted in FIG. 8 is an example of a suppressed image.

More specifically, the image 60 depicted in FIG. 8 includes the image 51 that includes a character string, and does not include the image 52 that corresponds to the image including the external appearance of the mackerel, depicted in FIG. 7. To paraphrase, the image 60 includes only the image 51 that includes the character string. The processing unit 112 acquires the image 50, carries out processing to delete the image 52 included in the image 50, and thereby obtains the image 60. It should be noted that the processing unit 112 may acquire the image 50 from a memory, or may acquire the image 50 from the display unit 113. The presentation control unit 111A outputs the image 60 to the display unit 113 for the image 60 to be displayed by the display unit 113 as an image that corresponds to instruction information.

The display unit 113 displays the image 50 depicted in FIG. 7 prior to displaying the image 60, and therefore, at the point in time at which the display unit 113 has displayed the image 50, the user U has already recognized the cooking action to be carried out. Consequently, the information amount of the instruction information that is displayed is reduced in such a way that the user U does not closely observe the instruction information displayed on the display unit 113. In this example, the image 60 is displayed by the display unit 113. At such time, the image 52 is not included in the image 60 depicted in FIG. 8, and therefore the attention of the user U being excessively directed toward the display unit 113 (the image 60) is suppressed, and the user U proceeds with the cooking while closely observing the ingredient that is the cooking subject, namely the mackerel. As a result, the risk of the user U injuring his or her hand decreases, and appropriate cooking by the user U can be realized.

Figure 9:
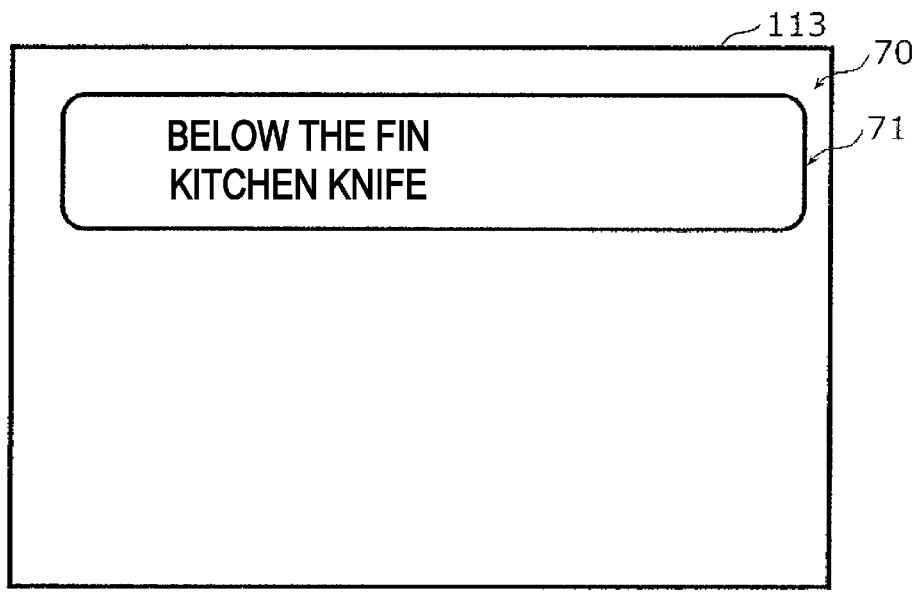
FIG. 9 is an explanatory diagram depicting an example of instruction information including a partially deleted character string, displayed by the display unit according to the embodiment.

FIG. 9 is an explanatory diagram depicting an example of instruction information including a character string displayed by the display unit 113 according to the present embodiment. More specifically, an image 70 is displayed on the display unit 113, the image 70 including an image 71 that corresponds to a character string from which one or more characters (also referred to as some characters) have been deleted from among the plurality of characters included in the character string depicted by the image 51, as an image of the character string included in the instruction information. The image 70 depicted in FIG. 9 is an example of an image obtained by the processing unit 112 processing the image 50 of FIG. 7. It should be noted that the image depicted in FIG. 9 is an example of a suppressed image. Character strings corresponding to words that must not be deleted from among text corresponding to the character string included in the instruction information may be retained in a memory of the terminal 10, for example, and the processing unit 112 may carry out processing to delete an image corresponding to one or more characters other than the words that must not be deleted, from among the characters included in the character string depicted by the image 51.

More specifically, the image 70 depicted in FIG. 9 includes the image 71 obtained by some of the characters included in the image 51 depicted in FIG. 7 being deleted, and does not include the image 52 of the external appearance of the mackerel. The processing unit 112 acquires the image 50, carries out processing to delete a portion of the image 51 included in the image 50 and to delete the image 52 included in the image 50, and thereby obtains the image 70. It should be noted that the processing unit 112 may acquire the image 50 from a memory, or may acquire the image 50 from the display unit 113. The presentation control unit 111A outputs the image 70 to the display unit 113 for the image 70 to be displayed by the display unit 113 as an image that corresponds to instruction information.

The display unit 113 displays the image 50 depicted in FIG. 7 prior to displaying the image 70, and therefore, at the point in time at which the display unit 113 has displayed the image 50, the user U has already recognized the cooking action to be carried out. Consequently, the information amount of the instruction information that is displayed is reduced in such a way that the user U does not closely observe the instruction information displayed on the display unit 113. In this example, the image 70 is displayed by the display unit 113. The image 52 is not included in the image 70 depicted in FIG. 9, and there are comparatively few characters included, and therefore the attention of the user U being directed toward the display unit 113 (the image 70) is suppressed even more, and the user U proceeds with the cooking while closely observing the mackerel that is the cooking subject. As a result, the risk of the user U injuring his or her hand decreases, and appropriate cooking by the user U can be realized.

FIG. 10 is an explanatory diagram depicting an example of instruction information including a character string and a drawing in which the colors have been altered, displayed by the display unit 113 according to the present embodiment. An image 80 depicted in FIG. 10 is an example of an image obtained by the processing unit 112 processing the image 50 of FIG. 7. It should be noted that the image depicted in FIG. 10 is an example of a suppressed image.

More specifically, the image 80 depicted in FIG. 10 is an image that has been processed in such a way that the tints of the colors are reduced, from the image 50 depicted in FIG. 7. The processing unit 112 acquires the image 50, carries out processing in such a way that the tints of the colors of the image 50 are reduced, and thereby obtains the image 80. For example, as a result of the processing, the image 51 in which black characters are written on a white background in the image 50 becomes, in the image 80, an image 81 in which gray characters are written on a white background. It should be noted that the image 81 may be an image in which black characters are written on a gray background. It should be noted that the processing unit 112 may acquire the image 50 from a memory, or may acquire the image 50 from the display unit 113. The presentation control unit 111A outputs the image 80 to the display unit 113 for the image 80 to be displayed by the display unit 113 as an image that corresponds to instruction information.

Furthermore, for example, as a result of the processing, the image 52 that includes the mackerel and the line segment in the image 50 becomes, in the image 80, an image 82 that includes the mackerel and the line segment expressed by means of gray lines or the like on a white background.

The display unit 113 displays the image 50 depicted in FIG. 7 prior to displaying the image 80, and therefore, at the point in time at which the display unit 113 has displayed the image 50, the user U has already recognized the cooking action to be carried out. Consequently, the information amount of the instruction information that is displayed is reduced in such a way that the user U does not closely observe the instruction information displayed on the display unit 113. In this example, the image 80 is displayed by the display unit 113. The tints of the colors in image 80 depicted in FIG. 10 are suppressed, and therefore the attention of the user U being directed toward the display unit 113 (the image 80) is suppressed, and the user U proceeds with the cooking while visually confirming the mackerel that is the cooking subject. As a result, the risk of the user U injuring his or her hand decreases, and appropriate cooking by the user U can be realized.

It should be noted that suppressing the tints of the colors, to paraphrase, can be said to be keeping the brightnesses of the colors within a similar range, or speaking more specifically, keeping the brightnesses of the colors within a brightness difference of approximately 2, within so-called adjacent brightnesses or similar brightnesses.

It should be noted that instead of suppressing the tints of the colors, a similar effect can also be obtained by keeping the hues of the colors included in the image 50 within a similar range (for example, keeping the hues within a range of an angle of 15 to 30 degrees in the hue circle or a hue difference of approximately 3 (within so-called adjacent hues or similar hues)), keeping the saturations of the colors within a similar range (a saturation difference of approximately 3, within a range of so-called adjacent saturations or similar saturations), or keeping the brightnesses of the colors within a similar range (a brightness difference of approximately 2, within so-called adjacent brightnesses or similar brightnesses).

The processing carried out by the cooking support system 1 configured as described above will be described.

Figure 11:
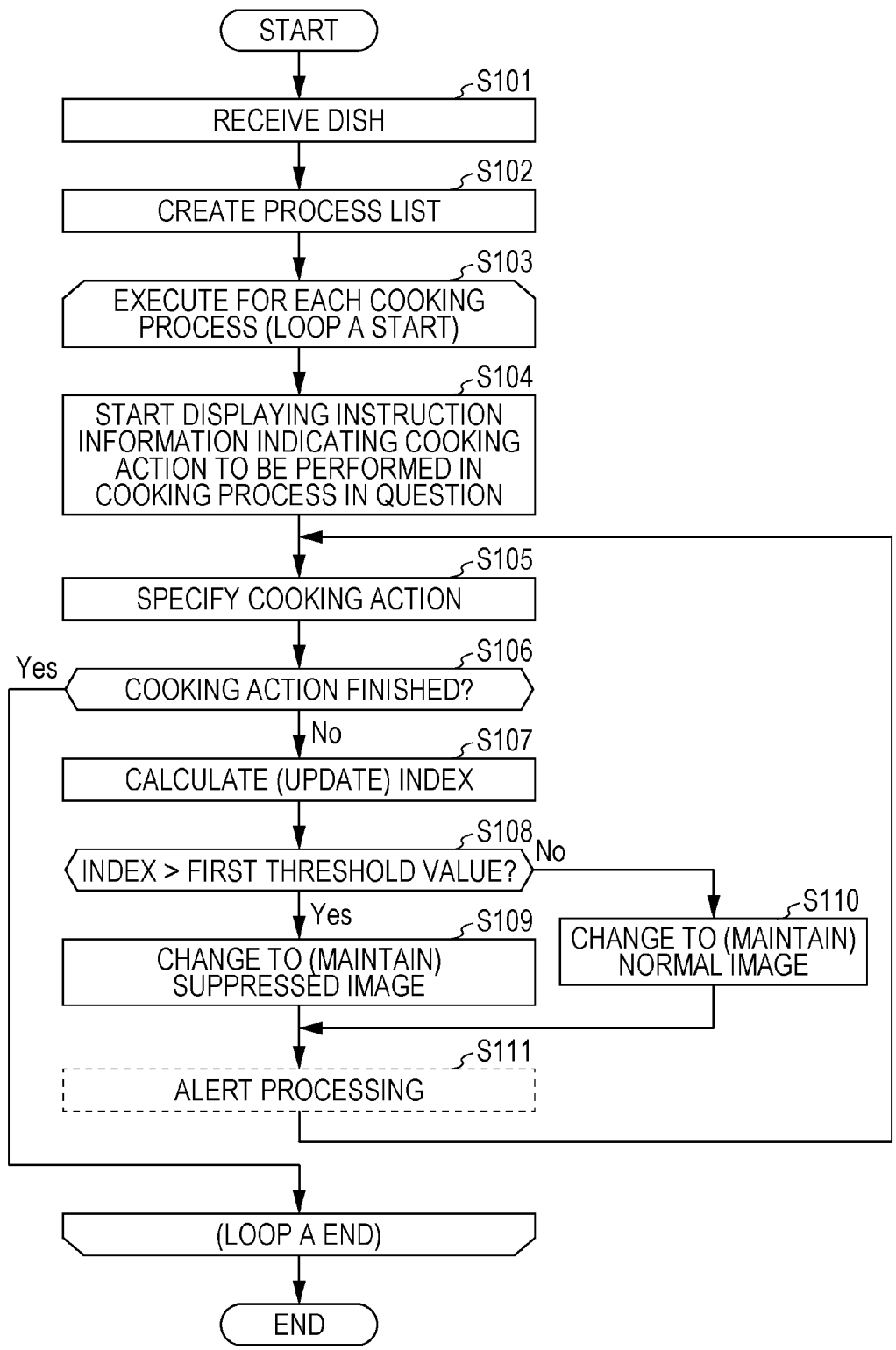
FIG. 11 is a flow diagram depicting processing carried out by the cooking support system according to the embodiment.

FIG. 11 is a flow diagram depicting processing carried out by the cooking support system 1 according to the present embodiment.

In step S101, the terminal 10 decides a dish to be created from thereon, on the basis of input performed by the user U or the like. At such time, the terminal 10 may, in a state in which a list of dishes that has been retained in advance is displayed, decide a dish by receiving a designation made by the user with respect to the displayed dishes. It should be noted that, in a state in which the list of dishes is displayed, an operation carried out by the user to search or narrow down the displayed dishes may be received.

In step S102, the process management unit 108 creates a process list of cooking processes for creating the dish decided in step S101. At such time, the process management unit 108 acquires a recipe retained thereby or a recipe retained by the server 30, and generates a process list that includes the cooking processes necessary to create the dish decided in step S101. An example of the generated process list is the process list 109. The process management unit 108 stores the process list 109 in a memory. The process management unit 108 provides the presentation unit 111 with an entry corresponding to the cooking process to be carried out first, from among the entries included in the process list 109. The process management unit 108 provides the presentation unit 111 with an entry corresponding to the cooking process to be carried out next, when the cooking action included in the provided entry ends. This processing is carried out until the presentation unit 111 is provided with an entry corresponding to the cooking process to be carried out last. Furthermore, the process management unit 108 provides the presentation unit 111 with an entry, and also provides the specifying unit 101 with information indicated in the cooking action 109D of the provided entry.

Alternatively, the process management unit 108 may provide the presentation unit 111 with the process list 109 all at once. In this case, each time the presentation unit 111 acquires one entry in the order in which the cooking processes proceed from within the process list 109, information indicated in the cooking action 109D of the entry may be provided to the specifying unit 101.

In step S103, one entry of the process list 109 is acquired in the order in which the cooking processes proceed, and the one acquired entry is used for the specifying unit 101, the calculation unit 105, and the presentation unit 111 to enter loop processing (loop A) in which step S104 to step S111, which are described later on, are repeated. The order in which the cooking processes proceed may be implemented in the order from the lower values for the process IDs indicated in the process list 109, for example. For example, for the six entries indicated in the process ID 109A of the process list 109, the aforementioned loop processing is carried out in order from the entry having process ID 1, and processing ends when the loop processing for the entry having process ID 6 ends.

In step S104, the presentation unit 111 starts displaying the instruction information included in an entry constituting a cooking process. It should be noted that if information indicating two cooking actions in one acquired entry is indicated in the cooking action 109D, display of the instruction information corresponding to each of these cooking actions is started. For example, if the cooking action of boiling water and the cooking action of cutting into thin strips are indicated in the cooking action 109D for the aforementioned entry, display of the instruction information corresponding to these cooking actions is started.

In step S105, the specifying unit 101 specifies the action being carried out by the user U at the present point in time, determines whether or not the specified action matches the cooking action indicated in the information included in the entry, and specifies that the user is carrying out this cooking action if the specified action matches the cooking action indicated in the information included in the entry. Furthermore, the specifying unit 101 outputs information indicating the specified cooking action to the calculation unit 105.

For the determination as to whether or not the aforementioned cooking action is being carried out by the user U, a determination as to whether or not the action of the user U matches the aforementioned cooking action, a determination as to whether or not the cooking action has been started by the user U, and a determination as to whether or not the cooking action has ended are carried out.

The specifying unit 101 may determine that the cooking action has been started by the user U, when having first determined that the aforementioned cooking action is being carried out by the user U.

The specifying unit 101 may determine that the cooking action is being carried out, when having once again determined that the aforementioned cooking action is being carried out, after having determined that the aforementioned cooking action is being carried out by the user U.

The specifying unit 101 may determine that the cooking action has been ended by the user U, when having determined that the aforementioned cooking action is not being carried out by the user U, after having determined that the aforementioned cooking action is being carried out by the user U.

It should be noted that in the case where it is permitted for a plurality of cooking actions to be carried out concurrently, in the present step, a plurality of cooking actions being carried out by the user U can be specified. For example, if the cooking action of boiling water and the cooking action of cutting into thin strips are indicated in the cooking action 109D for one entry, the specifying unit 101 specifies the two cooking actions of the cooking action of boiling water and the cooking action of cutting into thin strips as cooking actions being carried out by the user U.

In step S106, the specifying unit 101 specifies whether or not the cooking action has ended, on the basis of the specifying of the cooking action in step S105. In the case where it is determined that the cooking action has ended (yes in step S106), processing returns to the initial processing (step S104) in loop A, the next entry is newly acquired, and loop processing is carried out for the newly acquired entry. When the present cooking process is the final cooking process in the process list, namely the entry having process ID 6, processing exits loop A and the processing depicted in the present flow diagram ends. However, in the case where it is determined that the cooking action has not ended (no in step S106), processing proceeds to step S107. The case where it is determined that the cooking action has not ended means the case where it is determined that the cooking action is being carried out.

In the case where it is determined by the specifying unit 101 that the cooking action is being carried out, in step S107, the calculation unit 105 calculates an index indicating a degree of attention to be paid by the user U to the cooking subject recommended for the cooking action specified in step S105, and thereby acquires and retains the index in a memory. It should be noted that the present step can be executed once again in the case where step S105 is executed once again after step S109 described later on. Therefore, in the case where an index previously calculated by the calculation unit 105 is retained in a memory, the retained index is updated to the index newly calculated in the step in question.

Furthermore, in the case where there is one cooking action specified in step S105, in step S107, the calculation unit 105 may acquire the index corresponding to the cooking action specified in step S105, from within the reference table 106 retained in the memory, and may set this index as the index to be calculated.

The calculation unit 105 outputs the calculated index to the processing unit 112.

In step S108, the processing unit 112 determines whether or not the index calculated in step S107 exceeds a first threshold value. In the case where it is determined that the calculated index exceeds the first threshold value (yes in step S108), processing proceeds to step S109, and if not (no in step S108), processing proceeds to step S110.

In step S109, the processing unit 112 performs processing on the image corresponding to the instruction information displayed by the display unit 113, and thereby alters the aforementioned image to a suppressed image. It should be noted that in the case where a suppressed image is already being displayed by the display unit 113 at this point in time, the display of the suppressed image is maintained.

In step S110, the processing unit 112 performs processing on the image being displayed by the display unit 113, and thereby displays a normal image. In the case where the image being displayed by the display unit 113 is a suppressed image, the suppressed image is altered to a normal image. That is, the state is returned to prior to the information amount of the instruction information presented having been reduced, in the case where the index calculated after having reduced the information amount of the instruction information indicates that a degree of attention higher than a predetermined level should not be paid. It should be noted that in the case where a normal image is already being displayed by the display unit 113 at this point in time, the display of the normal image is maintained.

In step S111, the presentation unit 111 carries out alert processing. It should be noted that the detailed processing included in the alert processing will be described in detail later on. It should be noted that the alert processing is not essential processing. In the case where the alert processing is not carried out, processing proceeds to step S105 after step S109 or step S110 has ended.

Next, the alert processing will be described in detail.

Figure 12:
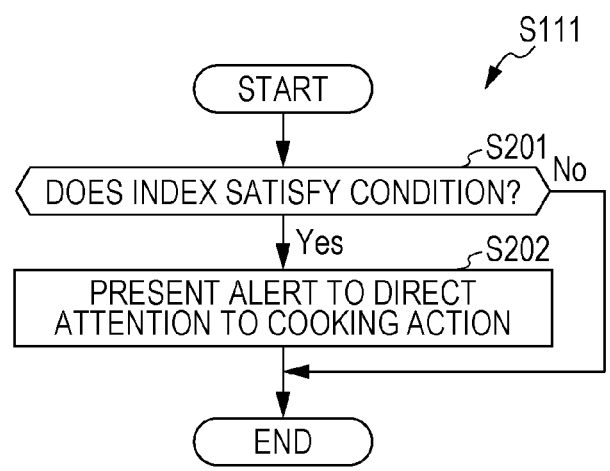
FIG. 12 is a flow diagram depicting alert processing carried out by the cooking support system according to the embodiment.
Figure 13:
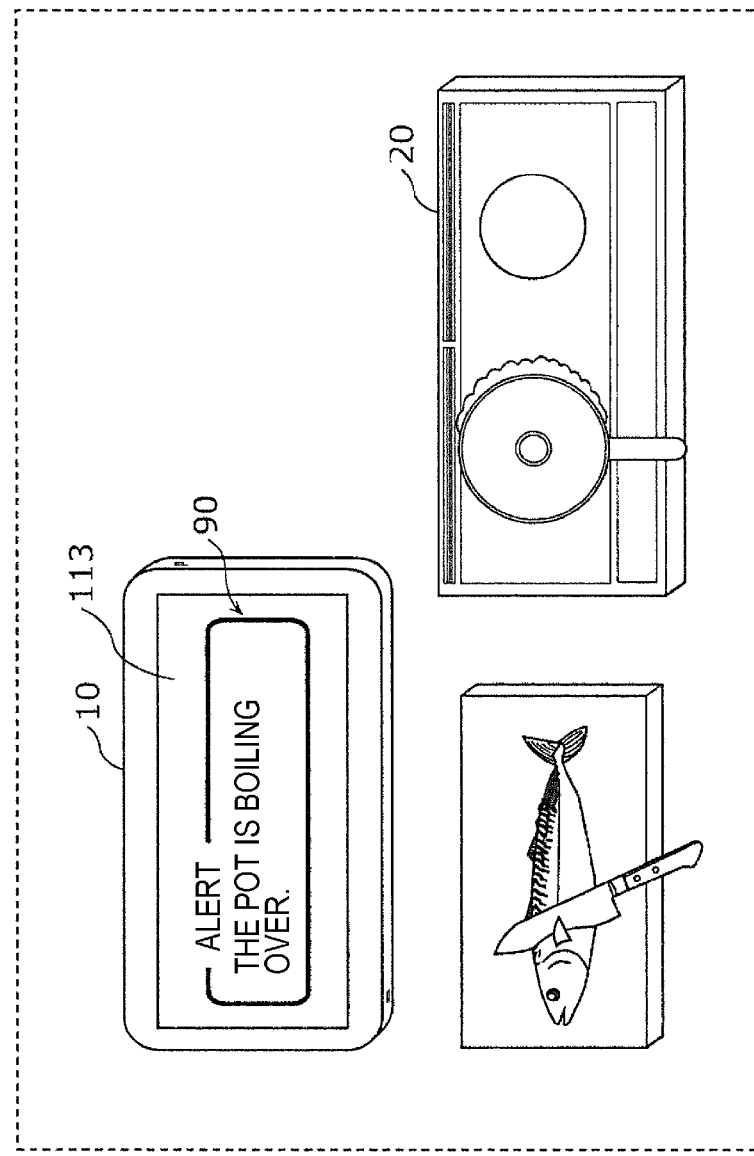
FIG. 13 is an explanatory diagram depicting an example of a scene in which the cooking support system according to the embodiment carries out the alert processing.

FIG. 12 is a flow diagram depicting the alert processing carried out by the cooking support system 1 according to the present embodiment. FIG. 13 is an explanatory diagram depicting an example of a scene in which the cooking support system 1 according to the present embodiment carries out the alert processing.

In step S201, the alert processing unit 115 determines whether or not the index calculated in step S107 satisfies a condition for presenting an alert. In the case where the calculated index satisfies the aforementioned condition, processing proceeds to step S202, and if not, the series of processing in the present flow diagram ends. It should be noted that in the case where a plurality of cooking processes are proceeding concurrently, in the present step, the alert processing unit 115 carries out the aforementioned determination for the indexes of the cooking actions that are proceeding concurrently.

For the aforementioned condition, for example, in the case where a cooking action included in the entry corresponding to the cooking process indicates boiling water, the reference table 107 depicted in FIG. 5 is used as the index corresponding to this cooking action. In the reference table 107 depicted in FIG. 5, when using the indexes associated with the temperature of the cooking appliance 20 that corresponds to the pot that is used when water is boiled (see FIG. 5), the condition can be set as being that the index sequentially changes to 4, 7, and 10 within a time of approximately 5 to 10 minutes. If the temperature intervals and indexes are further subdivided, the aforementioned changes can be detected more accurately.

In step S202, the alert processing unit 115 creates alert information in such a way that the user U pays attention to the cooking process for which the index has satisfied the aforementioned condition, and outputs the created alert information by means of the display unit 113 or the speaker 114. For example, the alert processing unit 115 creates the alert information as an image 90, and displays the created image 90 by means of the display unit 113 (see FIG. 13).

Hereinafter, another configuration relating to the cooking support system 1 and the processing carried out by the cooking support system 1 will be described. It should be noted that the cooking support system 1 and the processing carried out by the cooking support system 1 correspond to an information processing system and an information processing method in the description hereinafter.

Figure 1C:
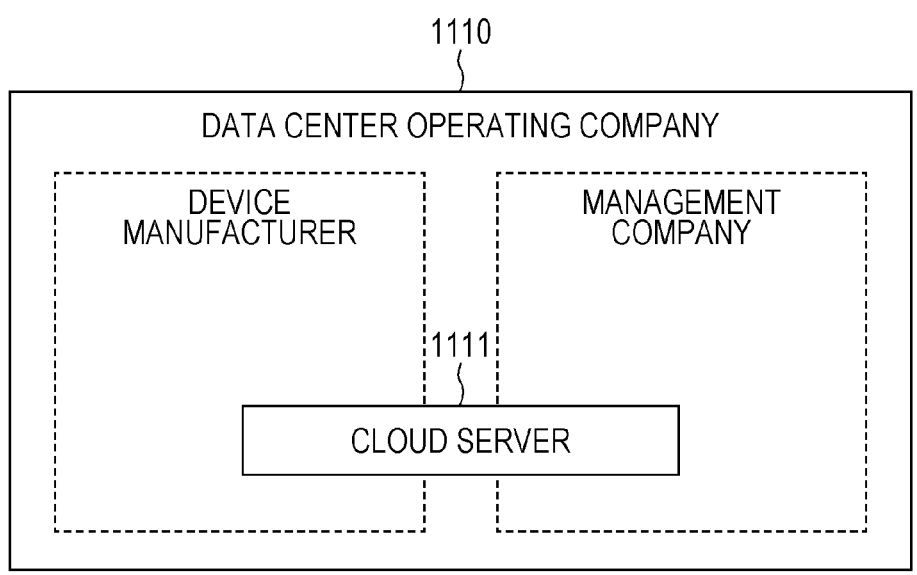
FIG. 1C is a third explanatory diagram depicting an overall view of a service provided by the cooking support system according to the embodiment.
Figure 14:
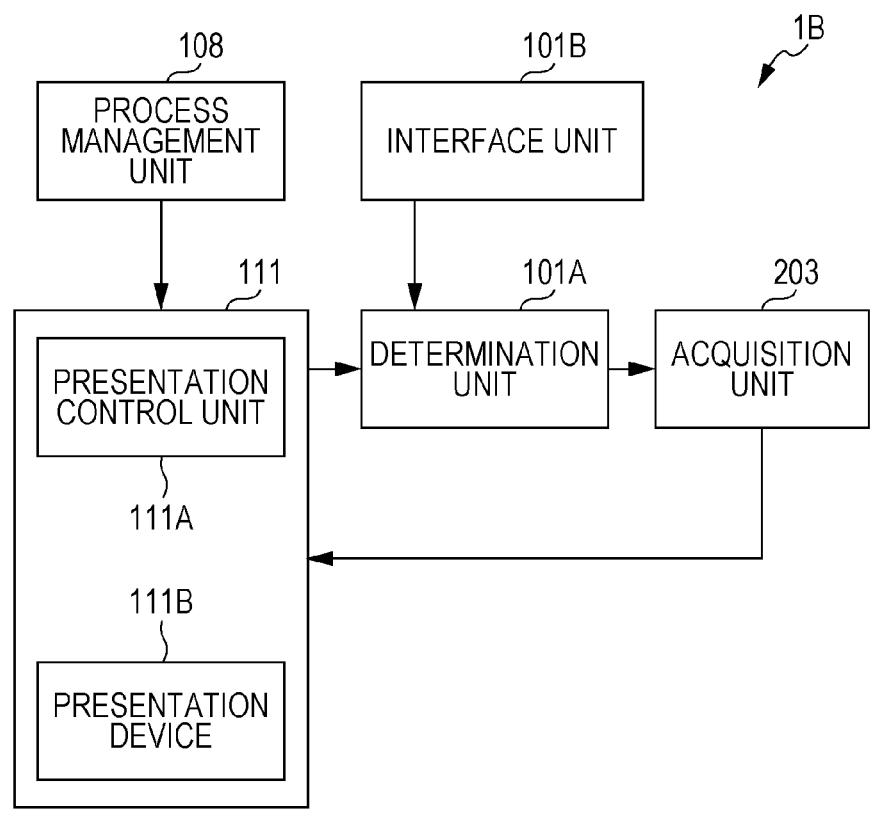
FIG. 14 is another schematic diagram depicting a configuration of the cooking support system according to the embodiment.

FIG. 14 is a schematic diagram depicting a configuration of an information processing system 1B according to the present modified example. In FIG. 14, items denoted by the same reference numbers as those depicted in FIG. 1 are the same or correspond thereto.

As depicted in FIG. 14, the information processing system 1B is provided with the presentation unit 111, the determination unit 101A, an acquisition unit 203, the process management unit 108, and the interface unit 101B. The presentation unit 111 includes the presentation control unit 111A and the presentation device 111B, as in FIG. 3. The functions of the presentation control unit 111A, the determination unit 101A, the acquisition unit 203, the process management unit 108, and the interface unit 101B can be realized by a processor executing a predetermined program using a memory or the like.

The process management unit 108 stores the process list 109 in a memory as described using FIG. 3.

The presentation unit 111 acquires first information that includes related information relating to a cooking action to be carried out by the cook. The related information, for example, includes information indicating a cooking action to be carried out by the cook and instruction information for instructing the cooking action. The presentation unit 111 presents the related information included in the first information. More specifically, the presentation control unit 111A acquires the first information from the process list 109 retained by the process management unit 108, and causes the presentation device 111B to present the instruction information included in the related information of the first information. The presentation device 111B includes the display unit 113 as described using FIG. 3. The presentation device 111B, when causing the display unit 113 to present the instruction information, causes the display unit 113 to present an image corresponding to the instruction information.

The display unit 113 is a display or a projector as mentioned above. In the case where the display unit 113 is a display, the instruction information is presented to the user by the image corresponding to the instruction information being displayed on the display. In the case where the display unit 113 is a projector, the instruction information is presented to the user by the image corresponding to the instruction information being projected by the projector.

Furthermore, a presentation unit 111 outputs information indicating the cooking action included in the related information of the first information to the determination unit 101A. The interface unit 101B outputs second information for specifying the form of an action of the cook, to the determination unit 101A.

The second information provided to the determination unit 101A by the interface unit 101B includes an image acquired by the camera, information indicating an operation of a cooking appliance, and information input by the user. Furthermore, the form of an action is a concept that includes whether or not an action is present, what kind of action is being carried out (whether or not a specific action is being carried out), and what kind of instrument is being used. The presentation device includes a display, a projector, a speaker, or the like.

With this configuration, the determination unit 101A acquires information indicating a cooking action and second information. The determination unit 101A specifies the action of the user U on the basis of the second information. Furthermore, the determination unit 101A determines whether or not the specified action of the user U matches a cooking action indicated by information provided from the presentation unit 201. In the case where the specified action of the user U matches the aforementioned cooking action, the determination unit 101A specifies that the action of the user U is the aforementioned cooking action. The determination unit 101A outputs information indicating the specified cooking action to the acquisition unit 203.

The acquisition unit 203 corresponds to the calculation unit 105 depicted in FIG. 3, for example. The acquisition unit 203 retains the reference table 106 and the reference table 107 in a memory, similar to the calculation unit 105. The acquisition unit 203 acquires an index indicating a recommended degree of attention of the cook for the cooking action indicated by the information received from the determination unit 101A. The acquisition unit 203 may acquire the index corresponding to the cooking action specified by the determination unit 101A, from the reference table 106, for example. In this case, the index acquired from the reference table 106 may be acquired as an index indicating a degree of attention recommended to be paid to the cooking subject by the cook.

Furthermore, in the case where there are a plurality of cooking actions specified by the determination unit 101A, the acquisition unit 203 may acquire the indexes corresponding to each of the plurality of cooking actions from the reference table 106. The acquisition unit 203 may then use these indexes to calculate an index indicating a degree of attention for the cook. For the calculation, for example, the total of the indexes corresponding to each of the plurality of cooking actions may be calculated, or the largest value may be calculated from among the indexes corresponding to each of the plurality of cooking actions. In this case, the calculated index is acquired as an index indicating the degree of attention to be paid to the cooking subject by the cook. The acquisition unit 203 outputs the acquired index to the presentation unit 111.

The presentation control unit 111A includes the processing unit 112, similar to FIG. 3. The processing unit 112 alters the information amount of the related information presented, in accordance with the degree of attention indicated by the acquired index. More specifically, the processing unit 112 alters the information amount of the instruction information presented, in accordance with the degree of attention indicated by the acquired index. The processing of the processing unit 112 has already been described and is therefore omitted here.

Figure 15:
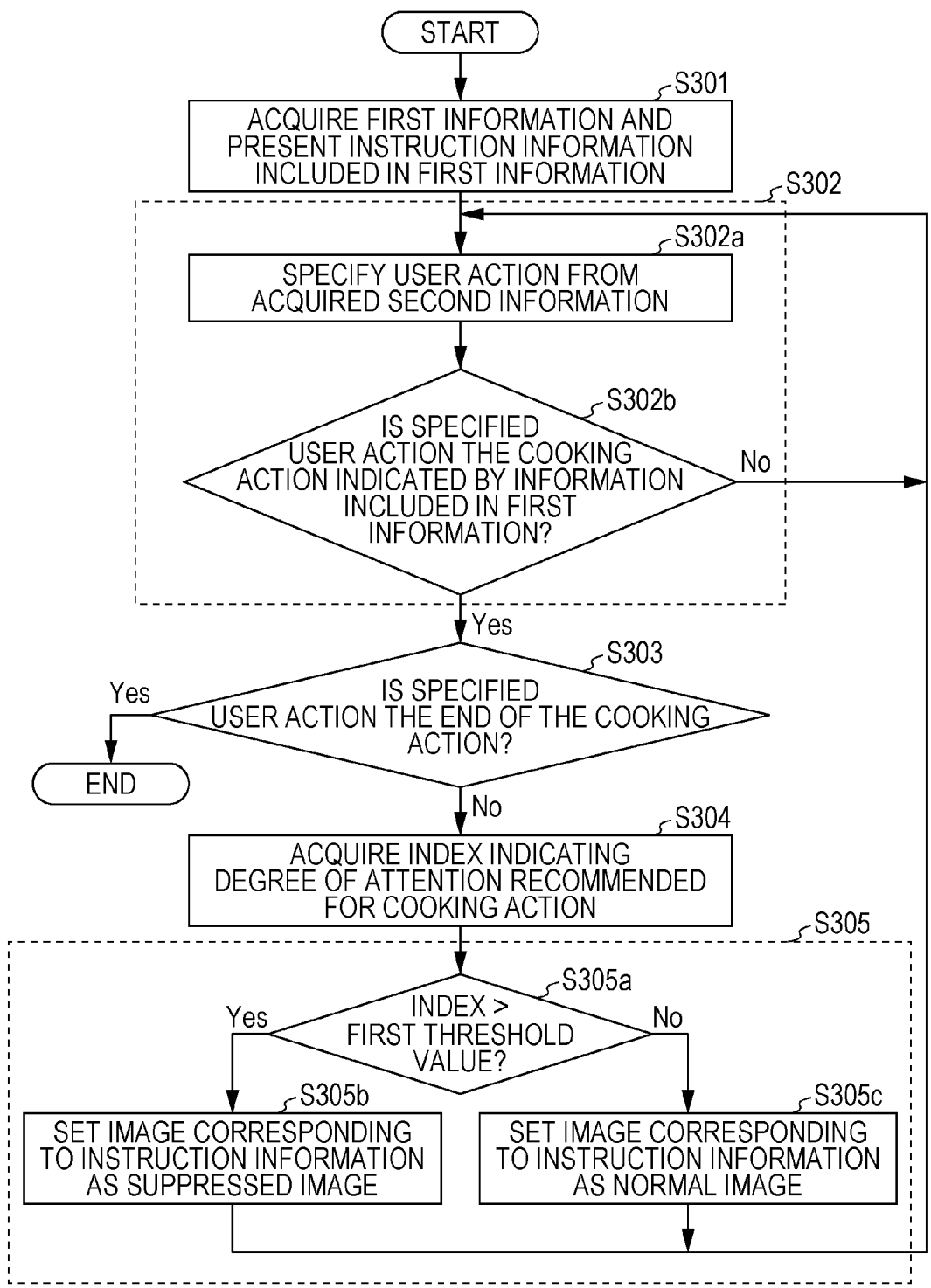
FIG. 15 is another flow diagram depicting processing of the cooking support system according to the embodiment.

FIG. 15 is a flow diagram depicting an information processing method executed by the information processing system 1B according to the present modified example. The present flow depicts an example of the processing carried out with respect to one entry included in the process list 109.

In step S301a, the presentation unit 201 acquires first information corresponding to an entry that includes information indicating a cooking action to be carried out by the cook and instruction information for instructing the cooking action, and causes the presentation device to present the instruction information included in the first information.

In step S302, the determination unit 101A determines whether or not an action of the user is the cooking action indicated by the information included in the first information. Specifically, step S302 includes steps S302a and S302b. In step S302a, the determination unit 101A specifies the action of the user on the basis of second information for specifying the form of an action of the cook acquired from the interface unit 101B.

Then, in step S302b, the determination unit 101A determines whether or not the action of the user is the cooking action indicated by the information included in the first information.

In step S302b, in the case where it is determined that the specified action of the user is not the cooking action indicated by the information included in the first information (no in step S302b), processing returns to step S302a, and the action of the user is specified based on second information that is newly acquired from the interface unit 101B.

In step S302b, in the case where it is determined that the specified action of the user is the cooking action indicated by the information included in the first information (yes in step S302b), processing proceeds to step S303. The case where it is determined that the specified action of the user is the cooking action indicated by the information included in the first information is the case where the specified action of the user is the start of the aforementioned cooking action, is the end of the aforementioned cooking action, or is in the middle of the aforementioned cooking action being carried out.

In step S303, the determination unit 101A determines whether or not the specified action of the user is the end of the aforementioned cooking action. This determination corresponds to determining whether or not the specified action of the user is a cooking action that is to be carried out in the entry corresponding to the acquired first information, namely whether or not the cooking action has ended.

In step S303, in the case where it is determined that the specified action of the user is not the end of the aforementioned cooking action (no in step S303), the determination unit 101A outputs information indicating the specified cooking action to the acquisition unit 203. Furthermore, on the other hand, in step S303, in the case where it is determined that the specified action of the user is the end of the aforementioned cooking action (yes in step S303), processing ends.

In step S304, the acquisition unit 203 acquires an index indicating a degree of attention of the cook recommended for the specified cooking action, and outputs the acquired index to the presentation control unit 111A.

In step S305, the presentation control unit 111A, or more specifically, the processing unit 112 alters the information amount of the instruction information presented, in accordance with the degree of attention indicated by the acquired index. Step S305 includes steps S305a, S305b, and S305c. In step S305a, the processing unit 112 determines whether or not the index acquired in step S304 is greater than a first threshold value.

In the case where it is determined that the acquired index is greater than the first threshold value (yes in step S305a), in step S305b, if a normal image is being presented by the presentation device 111B as an image corresponding to the instruction information, the processing unit 112 carries out processing in such a way that this image becomes a suppressed image, the presentation device 111B is made to present the suppressed image, and processing then returns to step S302a. It should be noted that in step S305b, if a suppressed image is being presented by the presentation device 111B as the image corresponding to the instruction information, processing returns to step S302a without anything being carried out.

In the case where it is determined that the acquired index is equal to or less than the first threshold value (no in step S305a), in step S305c, if the image corresponding to the instruction information is a suppressed image, the processing unit 112 carries out processing in such a way that this image becomes a normal image, the presentation device 111B is made to present the normal image, and processing then returns to step S302a. It should be noted that in step S305c, if a normal image is being presented by the presentation device 111B as the image corresponding to the instruction information, processing returns to step S302a without anything being carried out.

Thus, in the information processing system 1B, similar to the cooking support system and control method therefor according to the aforementioned embodiment and modified example thereof, the attention of the user being excessively directed toward the information processing system 1B is suppressed, thereby reducing factors that hinder close observation of the cooking subject. In this way, the information processing system 1B can present support in such a way that the user is able to carry out cooking more appropriately.

Here, the related information may include information indicating a cooking action to be carried out by the cook, and in the determining, it may be determined whether or not the action of the cook specified based on the second information is the cooking action indicated by the information included in the related information of the first information. Thus, a specific cooking action of the cook can be specified.

Furthermore, the form of an action of the cook may include the type of the cooking action or whether or not the cooking action is present. Thus, it is possible to specifically specify what the type of the cooking action is or whether or not the cooking action is present, as the form of the cooking action.

Furthermore, the form of an action of the cook may include the type of an instrument being used for the cooking action or whether or not there is the instrument. Thus, it is possible to specifically specify what the type of the instrument is or whether or not there is the instrument, as the form of the cooking action.

Furthermore, the related information may include instruction information instructing the cooking action to be carried out by the cook, in the outputting, the related information including the instruction information may be output to the presentation device, the degree of attention of the cook indicated by the index may be a degree of attention to be paid to the cooking subject by the cook, in the altering of the information amount of the related information, the information amount of the related information may be altered by reducing the information amount of the instruction information in the case where the degree of attention of the cook indicated by the index is greater than a threshold value, and the information processing method may additionally include outputting the related information having the altered amount to the presentation device in order to cause the presentation device to present the related information having the altered amount.

Thus, the attention of the user being excessively directed toward information presented on the presentation device 111B of the information processing system 1B is suppressed, thereby reducing factors that hinder close observation of the cooking subject. In this way, the information processing system 1B can provide support in such a way that the user is able to carry out cooking more appropriately.

Furthermore, the presentation device may include a display or a projector, and in the outputting of the related information, an image corresponding to the related information may be output to the presentation device in order to cause the display to display the image or the projector to project the image. Thus, owing to a specific configuration in which a display or a projector is used, the information processing system 1B can provide support in such a way that the user is able to carry out cooking more appropriately.

Furthermore, the related information may include instruction information instructing a cooking action to be carried out by the cook, the instruction information may include a plurality of images relating to an instruction for the cooking action, in the outputting, the plurality of images included in the instruction information may be output to the presentation device as images corresponding to the related information, the index indicating the degree of attention of the cook may be an index indicating a degree of attention to be paid to a subject being cooked by the cook, in the altering of the information amount of the related information, the information amount of the related information may be altered by a portion of the plurality of images being deleted, and the information processing method may additionally include outputting the related information having the altered information amount to the presentation device in order to cause the presentation device to present the related information having the altered information amount.

Thus, by altering an operation in such a way that only a portion of the displayed images are displayed, or altering an operation in such a way that only a portion of the projected images are projected, cooking support information can be presented in such a way that the user is able to carry out cooking more appropriately. This is because, by displaying only a portion of the displayed images or projecting only a portion of the projected images, the attention of the user being excessively directed toward information presented by the presentation device is suppressed, and factors that hinder close observation of the cooking subject are reduced.

The plurality of images may include a first image corresponding to character string information indicating a cooking procedure that allows the cook to carry out the cooking action and a second image corresponding to the external appearance of an object that is a cooking subject, and the portion of the plurality of images may be constituted by the second image.

Thus, due to only the first image corresponding to the character string information being presented by the presentation device, and the second image corresponding to the external appearance no longer being presented, the awareness of the user with respect to the images can be reduced with the information amount of the cooking procedure being maintained.

Furthermore, the plurality of images may include a first image corresponding to character string information indicating a cooking procedure that allows the cook to carry out the cooking action, and the portion of the plurality of images may include an image corresponding to one or more characters included in the character string information.

Thus, in the information processing system 1B, specifically, the attention of the user being excessively directed toward the information processing system can be suppressed by not allowing one or more characters included in the character string information to be presented.

The one or more characters may be different from a character string registered in advance in a memory.

Thus, in the information processing system 1B, specifically, the attention of the user being excessively directed toward the information processing system can be suppressed by not allowing character strings other than the character string registered in advance to be displayed as a portion of the character string information.

Modified Example of Embodiment

Figure 16:
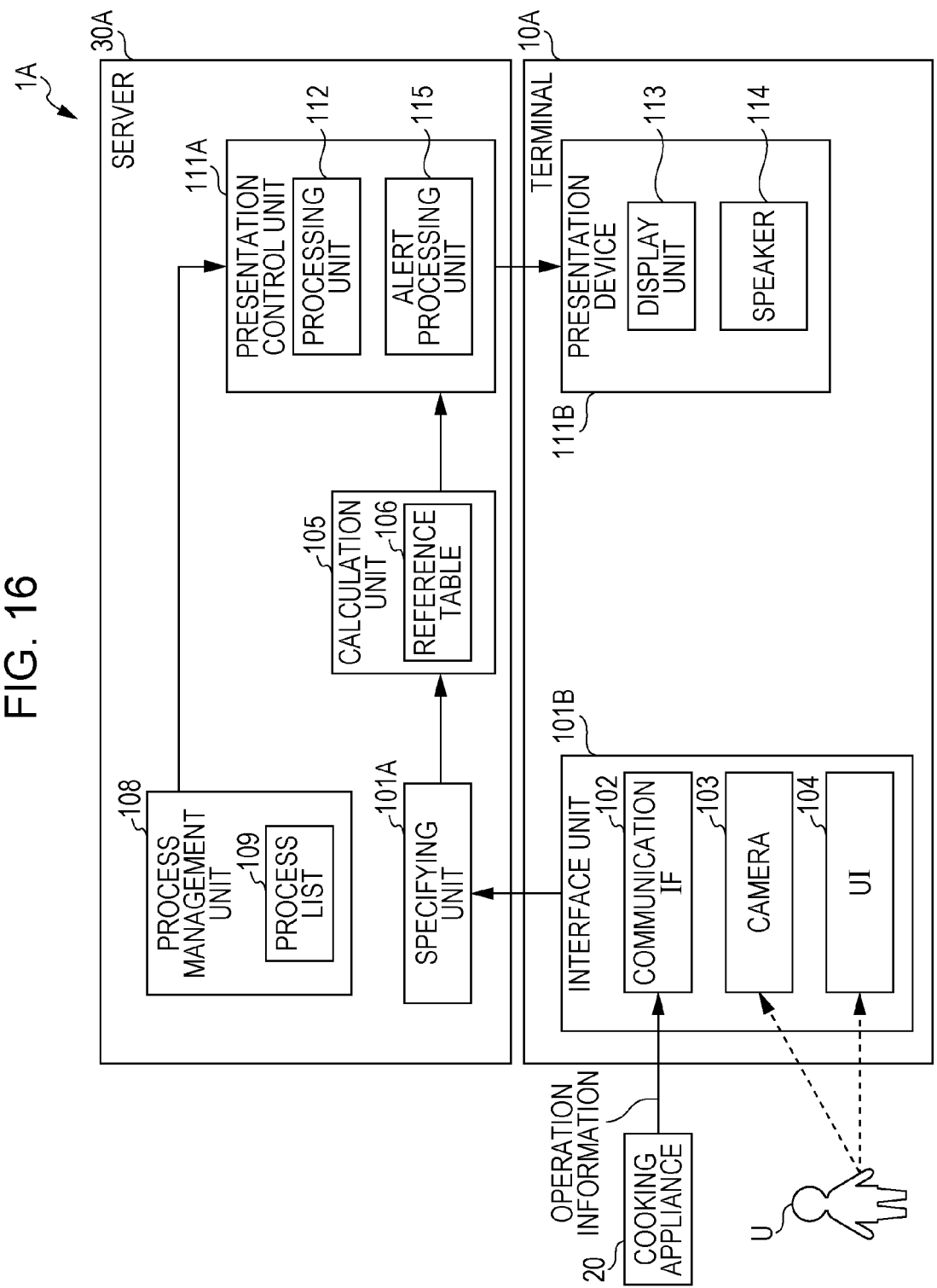
FIG. 16 is a schematic diagram depicting a configuration of a cooking support system according to modified example 1 of the embodiment.

FIG. 16 is a schematic diagram depicting a configuration of a cooking support system 1A according to the present modified example. The cooking support system 1A in FIG. 16 is characterized in that a server is provided with a portion of the constituent elements provided in the terminal 10 in the cooking support system 1 depicted in FIG. 3.

As depicted in FIG. 16, the cooking support system 1A is provided with a terminal 10A, a cooking appliance 20, and a server 30A. The terminal 10A, the cooking appliance 20, and the server 30A are communicably connected to each other via a network. The network, for example, includes a wireless LAN or the like constructed using the Internet 40 and a base station A that is connected to the Internet 40, depicted in FIG. 2; however, the network is not restricted thereto, and may include a cellular telephone network, a satellite communication network, a wired LAN, Bluetooth (registered trademark), or the like. The configuration of the present modified example has been obtained by reducing the functions of the terminal 10A as much as possible and increasing the functions of the server 30A to the same extent, in the configuration of the embodiment. The function as the entire system is the same as that of the cooking support system 1 of the embodiment. In FIG. 16, items denoted by the same reference numbers as the reference numbers depicted in FIG. 3 are the same as those depicted in FIG. 3 or correspond thereto.

The terminal 10A is provided with an interface unit 101B and a presentation device 111B.

The interface unit 101B is provided with one or more from among a communication IF 102, a camera 103, and a UI 104. The communication IF 102, the camera 103, and the UI 104 are the same as the constituent elements of the same names in the embodiment. The interface unit 101B transmits information acquired by one or more from among the communication IF 102, the camera 103, and the UI 104 to the server 30A.

The server 30A is provided with a determination unit 101A, a calculation unit 105, a process management unit 108, and a presentation control unit 111A.

The determination unit 101A is a processing unit that specifies a cooking process being carried out by the user U, on the basis of information acquired from the interface unit 101B (more specifically, the communication IF 102, the camera 103, the UI 104, or the like).

The presentation control unit 111A is a processing unit that controls presentation performed by the presentation device 111B of the terminal 10A. The presentation control unit 111A is a processing unit that carries out processing to reduce the information amount of the instruction information being presented by the presentation device 111B (display unit 113), in the case where a degree of attention indicated by an index calculated by the calculation unit 105 is greater than a first threshold value that corresponds to a predetermined threshold value.

The calculation unit 105 and the process management unit 108 are the same as the calculation unit 105 and the process management unit 108 depicted in FIG. 3, and therefore detailed descriptions thereof are omitted here.

Thus, an effect similar to that of the cooking support system 1 in the aforementioned embodiment is demonstrated. It should be noted that the cooking support system 1A, as mentioned above, has been obtained by reducing the functions of the terminal 10A as much as possible and increasing the functions of the server 30A to the same extent. Thus, not only the configuration depicted in FIG. 16, but various configurations can also be adopted, such as a configuration in which only the specifying unit 101A has been moved to the terminal 10A and a configuration in which the specifying unit 101A and the calculation unit 105 have been moved to the terminal 10A from the configuration depicted in FIG. 16, for example.

It should be noted that by the consolidating the main processing units into the server 30A in the cooking support system 1A, there are benefits such as improving the efficiency of the processing performed by the processing units and reducing the time and labor for the maintenance and updating of software.

Hereinabove, an embodiment and a modified example have been described in detail with reference to the drawings; however, the functions of devices such as the aforementioned terminal 10 or 10A or the server 30 or 30A may be realized by means of a computer program.

Figure 17:
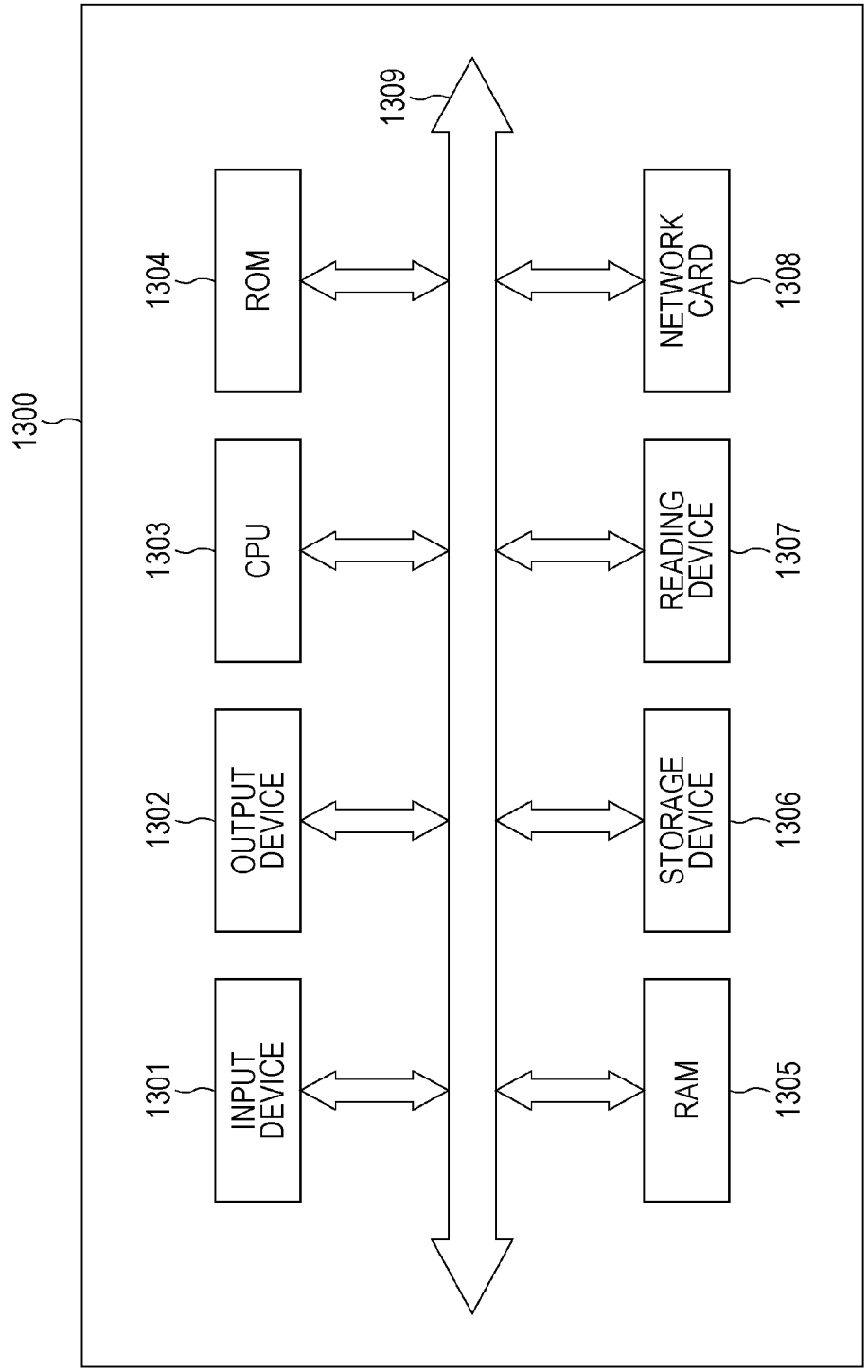
FIG. 17 is a diagram depicting a hardware configuration of a computer that realizes, by means of a program, the functions of each device in the cooking support system according to the embodiment and the modified example.

FIG. 17 is a drawing depicting a hardware consideration of a computer that realizes the functions of the devices by means of a program. For example, this computer 1300 is provided with an input device 1301 such as a keyboard and mouse or a touch pad, an output device 1302 such as a display or speaker, a central processing unit (CPU) 1303, a read-only memory (ROM) 1304, a random-access memory (RAM) 1305, a storage device 1306 such as a hard disk device or an solid-state drive (SSD), a reading device 1307 that reads information from a recording medium such as a digital versatile disc read-only memory (DVD-ROM) or a Universal Serial Bus (USB) memory, and a network card 1308 that performs communication via a network, and the units are connected by a bus 1309.

The reading device 1307 then reads a program for realizing the functions of the aforementioned devices from a recording medium having the program recorded thereon, and causes the storage device 1306 to store the program. Alternatively, the network card 1308 communicates with a server device connected to the network, and causes the storage device 1306 to store the program for realizing the functions of the aforementioned devices, which has been downloaded from the server device.

The CPU 1303 then copies the program stored in the storage device 1306 to the RAM 1305, and sequentially reads out commands included in that program from the RAM 1305 and executes the commands, and the functions of the aforementioned devices are thereby realized.

It should be noted that the technique described in the aforementioned aspect can be realized in the following types of cloud services, for example. However, the types of cloud services with which the technique described in the aforementioned aspect is realized are not restricted hereto.

(Type 1 Service: In-Company Data Center Type of Cloud Service)

Figure 18:
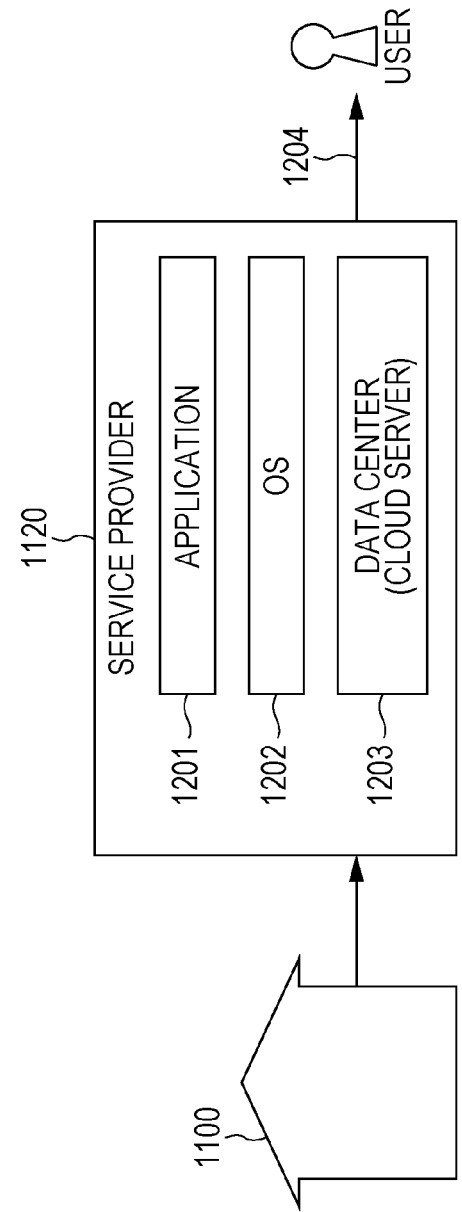
FIG. 18 is a diagram depicting an overall view of a service provided by an information management system in a type 1 service (in-company data center type of cloud service)

FIG. 18 is a diagram depicting an overall view of a service provided by an information management system in a type 1 service (in-company data center type of cloud service). In the present type, the service provider 1120 acquires information from the group 1100, and provides a service to the users. In the present type, the service provider 1120 has the functions of a data center operating company. In other words, the service provider 1120 possesses the cloud server 1111, which manages big data. Consequently, there is no data center operating company.

In the present type, the service provider 1120 operates and manages a data center (cloud server) 1203. Furthermore, the service provider 1120 manages an operating system (OS) 1202 and an application 1201. The service provider 1120 uses the OS 1202 and the application 1201 managed by the service provider 1120 to provide a service (arrow 1204).

(Type 2 Service: IaaS Utilizing Type of Cloud Service)

Figure 19:
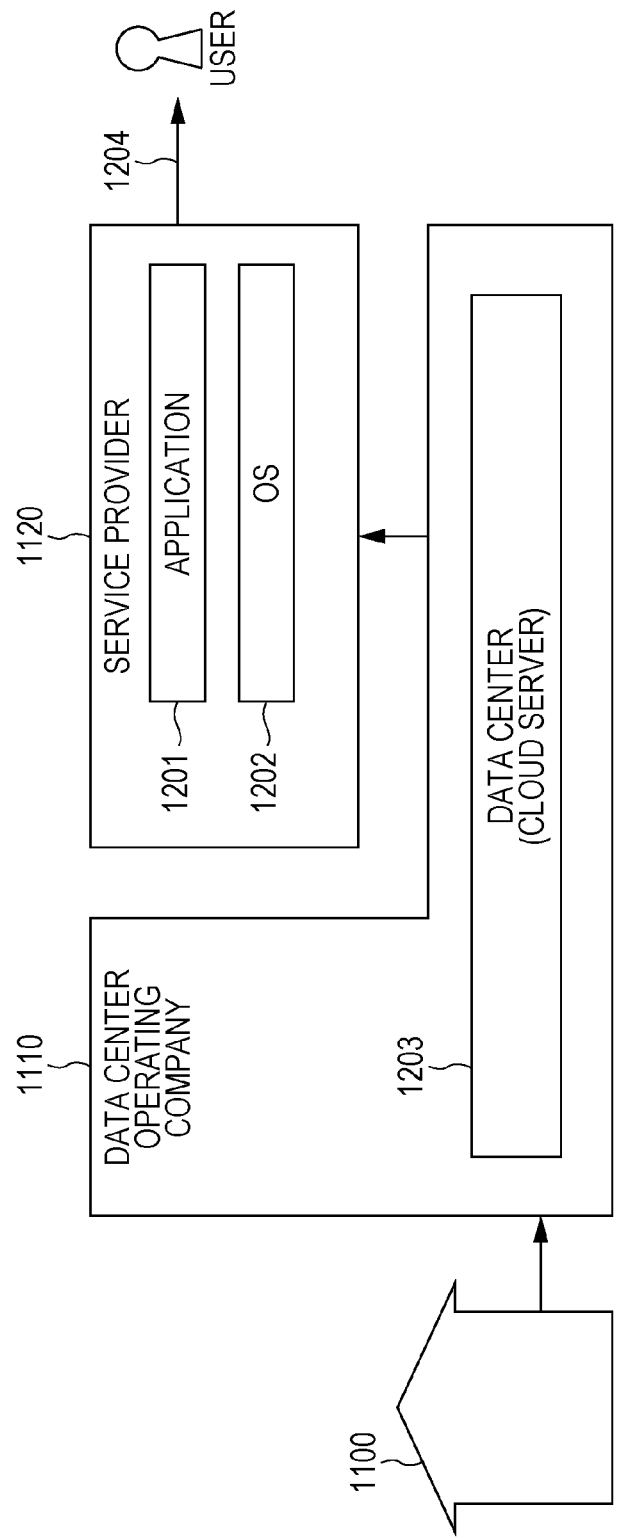
FIG. 19 is a diagram depicting an overall view of a service provided by an information management system in a type 2 service (IaaS utilizing type of cloud service)

FIG. 19 is a diagram depicting an overall view of a service provided by an information management system in a type 2 service (IaaS utilizing type of cloud service). Here, IaaS is an abbreviation for infrastructure as a service, and is a cloud service provision model in which an infrastructure for constructing and operating a computer system is itself provided as a service via the Internet.

In the present type, the data center operating company 1110 operates and manages the data center (cloud server) 1203. Furthermore, the service provider 1120 manages the OS 1202 and the application 1201. The service provider 1120 uses the OS 1202 and the application 1201 managed by the service provider 1120 to provide a service (arrow 1204).

(Type 3 Service: PaaS Utilizing Type of Cloud Service)

Figure 20:
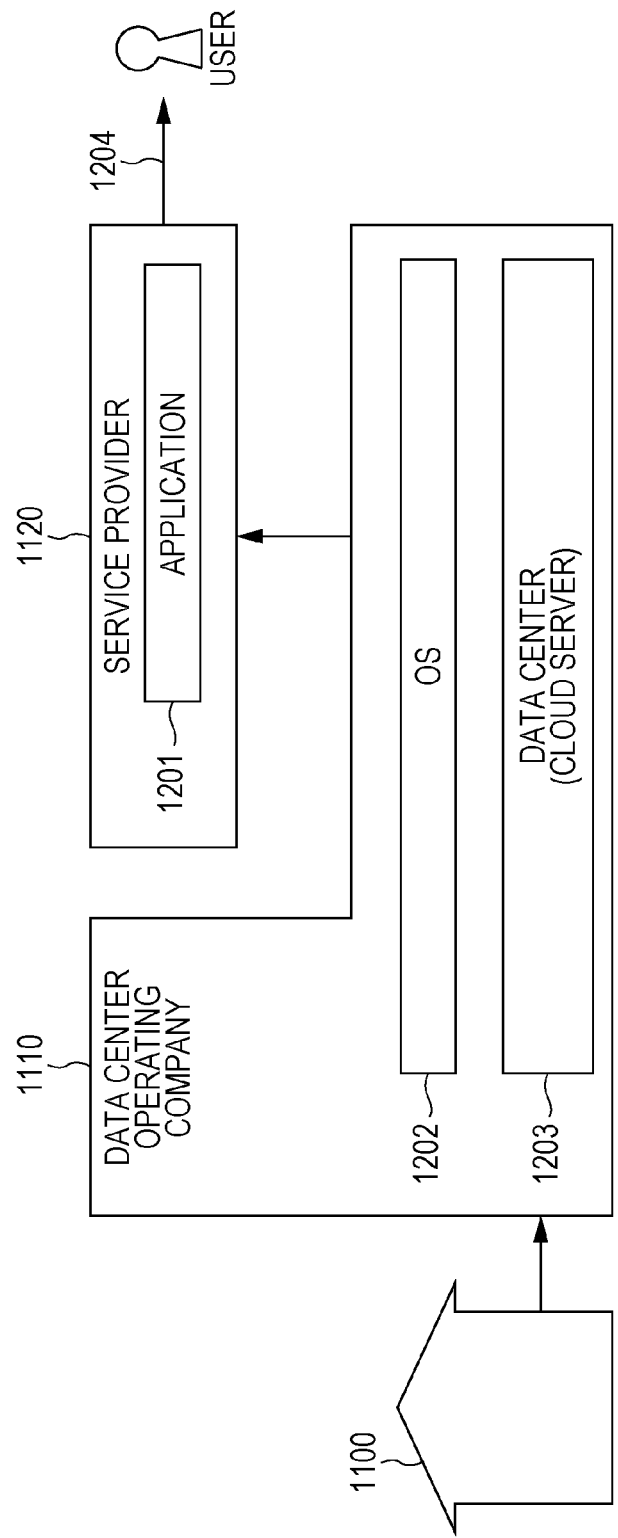
FIG. 20 is a diagram depicting an overall view of a service provided by an information management system in a type 3 service (PaaS utilizing type of cloud service)

FIG. 20 is a diagram depicting an overall view of a service provided by an information management system in a type 3 service (PaaS utilizing type of cloud service). Here, PaaS is an abbreviation for platform as a service, and is a cloud service provision model in which a platform that is a foundation for constructing and operating software is provided as a service via the Internet.

In the present type, the data center operating company 1110 manages the OS 1202 and operates and manages the data center (cloud server) 1203. Furthermore, the service provider 1120 manages the application 1201. The service provider 1120 uses the OS 1202 managed by the data center operating company 1110 and the application 1201 managed by the service provider 1120 to provide a service (arrow 1204).

(Type 4 Service: SaaS Utilizing Type of Cloud Service)

FIG. 21 is a diagram depicting an overall view of a service provided by an information management system in a type 4 service (SaaS utilizing type of cloud service). Here, SaaS is an abbreviation for software as a service, and, for example, is a cloud service provision model that has a function with which it is possible for a user such as company or an individual who does not possess a data center (cloud server) to use an application provided by a platform provider that does possess a data center (cloud server), via a network such as the Internet.

In the present type, the data center operating company 1110 manages the application 1201, manages the OS 1202, and operates and manages the data center (cloud server) 1203. Furthermore, the service provider 1120 uses the OS 1202 and the application 1201 managed by the data center operating company 1110 to provide a service (arrow 1204).

As described above, the service provider 1120 provides a service in all of the types of cloud service. Furthermore, for example, the development of an OS, an application, a database for big data, or the like may be implemented by the service provider or the data center operating company itself, or may be outsourced to a third party.

As mentioned above, the cooking support method of the present embodiment presents instruction information (corresponding to "information") when the user is not carrying out cooking or when the user is carrying out cooking for which the degree of attention to be paid by the user is comparatively low. However, when the user is carrying out cooking for which the degree of attention to be paid by the user is comparatively high, the information amount of the instruction information presented is reduced. Thus, the cooking support system suppresses the attention of the user being excessively directed toward the cooking support system, thereby reducing factors that hinder close observation of the cooking subject. In this way, the cooking support system can present cooking support information in such a way that the user is able to carry out cooking more appropriately.

It should be noted that when the user is not able to carry out cooking appropriately, problems can occur in that it is necessary for some or all of the cooking to be redone, and there is an increase in the consumption of energy resources such as electrical power. The cooking support system of the present disclosure is able to present cooking support information in such a way that the user is able to carry out cooking more appropriately, and therefore there is also an effect in that an increase in the consumption of energy resources such as electrical power is prevented in advance.

Furthermore, by altering an operation in such a way that only a portion of the displayed images are displayed, more specifically, cooking support information can be presented in such a way that the user is able to carry out cooking more appropriately. This is because, by displaying only a portion of the displayed images, the attention of the user being excessively directed toward the cooking support system is suppressed, and factors that hinder close observation of the cooking subject are reduced.

Furthermore, by eliminating the display of the images, more specifically, cooking support information can be presented in such a way that the user is able to carry out cooking more appropriately. This is because, by eliminating the display of the images, the attention of the user being excessively directed toward the cooking support system is suppressed, and factors that hinder close observation of the cooking subject are reduced.

Furthermore, by presenting information by means of sound as well as not displaying images, more specifically, cooking support information can be presented in such a way that the user is able to carry out cooking more appropriately. This is because, by eliminating the display of the images, the attention of the user being excessively directed toward the cooking support system is suppressed, and factors that hinder close observation of the cooking subject are reduced by presenting information by means of sound.

Furthermore, in the case where a plurality of cooking processes are proceeding concurrently, the displayed images are controlled using a total value of the indexes calculated for each of the plurality of cooking processes that are proceeding concurrently. By using a total value of the indexes, a comparatively high index is calculated in the case where a comparatively large number of cooking processes are proceeding concurrently, and, as a result, there is a benefit in that a higher degree of attention can be prompted from the user.

Furthermore, in the case where a plurality of cooking processes are proceeding concurrently, the displayed images are controlled using the largest value from among the indexes calculated for each of the plurality of cooking processes that are proceeding concurrently. By using the largest value of the indexes, even in the case where a plurality of cooking processes are proceeding concurrently, there is a benefit in that the images displayed can be controlled using an index that is independently calculated from each of the plurality of cooking processes, regardless of the number of cooking processes that are proceeding concurrently.

Furthermore, a cooking process that requires the user to perform an urgent countermeasure can be presented to the user. In particular, in the case where a plurality of cooking processes are proceeding concurrently, it is possible to suppress the inappropriate result of the user not being able to direct his or her attention to other cooking processes as a result of his or her attention being excessively directed to a portion of the cooking processes from among the plurality of cooking processes.

Furthermore, the information amount of the information presented is returned to the original amount in the case where a state is no longer in effect in which the degree of attention to be paid by the user is high after the amount of information presented has been reduced. Thus, the user is able to once again return to a state of carrying out cooking while visually confirming the cooking support system.

Furthermore, more specifically, it is possible for a cooking process to be specified based on the operating state of a cooking appliance.

Furthermore, more specifically, it is possible for the index to be calculated based on the operating state of the cooking appliance.

Heretofore, a description of a cooking support method according to one or more aspects of the present disclosure has been given on the basis of an embodiment; however, the present disclosure is not restricted to this embodiment. Modes in which various modifications conceived by a person skilled in the art have been implemented in the present embodiment, and separate modes constructed by combining the constituent elements from different embodiments may also be included within the scope of one or more aspects of the present disclosure provided they do not depart from the purpose of the present disclosure.

The present disclosure is useful as a cooking support method or the like that is able to support a user in carrying out cooking more appropriately.

What is claimed is:

1. An information processing method, including, using a processor, the information processing method comprising:
   acquiring first information including related information relating to a cooking action of a target recipe to be carried out by a cook, the target recipe including a plurality of cooking actions, and each of the plurality of cooking actions has an index value indicating a degree of attention of the cook recommended for a respective cooking action;
   outputting the related information of the plurality of cooking actions to a presentation device in order to cause the presentation device to display the related information on the presentation device;
   acquiring second information for specifying a form of an action of the cook;
   specifying the action of the cook, based on the second information;
   determining whether or not the specified action of the cook corresponds to a target cooking action, the target cooking action being one of the plurality of the cooking actions of the target recipe;
   when the specified action of the cook is determined to correspond to be the target cooking action of the target recipe,
      acquiring an index value of the target cooking action indicating a degree of attention of the cook recommended for the target cooking action of the target recipe,
      altering amount of display information of the related information of the target cooking action displayed on the presentation device and outputting the altered amount of display information of the related information of the target cooking action to the presentation device, when the degree of attention indicated by the acquired index value of the target cooking action is greater than a reference threshold value, and outputting the related information of the target cooking action to the presentation device without altering the amount of display information, when the degree of attention indicated by the acquired index value of the target cooking action is less than or equal to the reference threshold value; and when the specified action is determined not to be the one of the plurality of cooking actions of the target recipe, outputting the specified action to the presentation device.

2. The information processing method according to claim 1,
wherein, in the determining, it is determined, based on the second information, whether or not the specified action of the cook is the target cooking action indicated by information included in the related information of the target cooking action of the first information.

3. The information processing method according to claim 1,
wherein the form of the action of the cook includes an indication of a presence of the cooking action or a type of the cooking action.

4. The information processing method according to claim 1,
wherein the form of the action of the cook includes an indication of an instrument being used for the cooking action or a type of the instrument.

5. The information processing method according to claim 1,
wherein the related information of the target cooking action includes instruction information instructing the target cooking action to be carried out by the cook,
in the outputting, the related information of the target cooking action including the instruction information is output to the presentation device,
the degree of attention of the cook indicated by the index value is a degree of attention to be paid to a cooking subject by the cook,
in the altering of the amount of display information of the related information of the target cooking action, the amount of display information of the related information of the target cooking action is altered by reducing an amount of display information of the instruction information,
and the information processing method further includes outputting the related information of the target cooking action having the altered amount of display information to the presentation device in order to cause the presentation device to display the related information of the target cooking action having the altered amount of display information.

6. The information processing method according to claim 1,
wherein, the presentation device includes a display or a projector, and
wherein, in the outputting of the related information of the target cooking action, an image corresponding to the related information of the target cooking action is output to the presentation device in order to cause the display to display the image or the projector to project the image.

7. The information processing method according to claim 6,
wherein the related information of the target cooking action includes instruction information instructing the target cooking action to be carried out by the cook,
the instruction information includes a plurality of images relating to an instruction for the target cooking action,
in the outputting, the plurality of images included in the instruction information are output to the presentation device as images corresponding to the related information of the target cooking action,
the index value indicating the degree of attention of the cook is an index value indicating a degree of attention to be paid to a subject being cooked by the cook,
in the altering of the amount of display information of the related information of the target cooking action, the amount of display information of the related information of the target cooking action is altered by a portion of the plurality of images being removed from display,
and the information processing method further includes outputting the related information of the target cooking action having the altered information amount of display information to the presentation device in order to cause the presentation device to display the related information of the target cooking action having the altered amount of display information.

8. The information processing method according to claim 7,
wherein the plurality of images includes a first image corresponding to character string information indicating a cooking procedure that allows the cook to carry out the target cooking action and a second image corresponding to an external appearance of an object that is a cooking subject,
and the portion of the plurality of images are constituted by the second image.

9. The information processing method according to claim 7,
wherein the plurality of images includes a first image corresponding to character string information indicating a cooking procedure that allows the cook to carry out the target cooking action,
and the portion of the plurality of images include an image corresponding to one or more characters included in the character string information.

10. The information processing method according to claim 9,
wherein the one or more characters are different from a character string registered in advance in a memory.

11. The information processing method according to claim 7,
wherein, in the altering of the amount of display information of the related information of the target cooking action, the amount of display information of the related information of the target cooking action is altered by all of the plurality of images being removed from display.

12. The information processing method according to claim 11,
wherein the presentation device further includes a speaker,
and the information processing method further includes outputting, to the presentation device, speech data including speech corresponding to content instructed by the instruction information, in order to cause the speaker to output the speech corresponding to the content instructed by the instruction information, in a case where an information amount of the instruction information has been altered as the related information of the target cooking action.

13. The information processing method according to claim 1,
wherein
in the specifying, a plurality of actions of the cook are specified as actions of the cook,
in the determining, the specified plurality of actions of the cook are determined to be the plurality of cooking actions,
in the acquiring of the index value, index values each indicating a degree of attention of the cook recommended for each of the plurality of cooking actions are acquired in a case where it is determined that the specified plurality of actions of the cook are the plurality of cooking actions,
and in the altering, the amount of display information of the related information of the target cooking action displayed is altered in accordance with a total value of the degrees of attention indicated by the acquired index values.

14. The information processing method according to claim 1,
wherein
in the specifying, a plurality of actions of the cook are specified as actions of the cook,
in the determining, the specified plurality of actions of the cook are determined to be the plurality of cooking actions,
and in the acquiring of the index value, an index value indicating a largest degree of attention is acquired as the index value, from among index values indicating degrees of attention of the cook recommended for each of the plurality of cooking actions, in a case where it is determined that the specified plurality of actions of the cook are the plurality of cooking actions.

15. The information processing method according to claim 5,
wherein, after the related information of the target cooking action having the altered amount of display information has been output to the presentation device,
in the acquiring of the second information, new second information for specifying the form of the action of the cook is acquired,
in the specifying, the action of the cook is newly specified based on the new second information,
in the determining, it is newly determined that the newly specified action of the cook is the target cooking action,
in the acquiring of the index value, a new index value indicating a degree of attention of the cook recommended for the target cooking action is acquired in a case where it is determined that the newly specified action of the cook is the target cooking action,
and the information processing method additionally includes:
returning the amount of display information of the related information of the target cooking action displayed on the presentation device, to the amount of display information prior to being altered due to the altering, in a case where the degree of attention indicated by the acquired new index value is equal to or less than a threshold value; and
outputting the related information of the target cooking action to the presentation device in order to cause the presentation device to display the related information of the target cooking action having been returned to the amount of display information prior to being altered due to the altering.

16. The information processing method according to claim 1,
wherein the second information includes information indicating an operating state of a cooking appliance being used for cooking by the cook,
in the specifying, the action of the cook is specified based on the information indicating the operating state included in the acquired second information,
and in the determining, it is determined that the specified action of the cook is the target cooking action.

17. The information processing method according to claim 16,
wherein, in the acquiring of the index value, an index value indicating a degree of attention of the cook recommended for the target cooking action indicated by the first information is calculated based on the information indicating the operating state included in the acquired second information, and the calculated index value is acquired as the index value.

18. The information processing method according to claim 5,
wherein, after the related information of the target cooking action having the altered amount of display information has been output to the presentation device,
in the acquiring of the second information, new second information for specifying the form of the action of the cook is acquired,
in the specifying, the action of the cook is newly specified based on the new second information,
in the determining, it is newly determined that the newly specified action of the cook is the target cooking action,
in the acquiring of the index value, a new index value indicating a degree of attention of the cook recommended for the target cooking action is acquired in a case where it is determined that the newly specified action of the cook is the target cooking action,
and the information processing method additionally includes outputting a warning for the target cooking action to the presentation device in order to cause the presentation device to display the warning, in a case where the calculated index value and the newly calculated index value satisfy a predetermined condition.

19. An information processing system, comprising:
a presentation controller that
acquires first information including related information relating to a cooking action of a target recipe to be carried out by a cook, the target recipe including a plurality of cooking actions, and each of the plurality of cooking actions has an index value indicating a degree of attention of the cook recommended for a respective cooking action, and
outputs the related information of the plurality of cooking actions to a presentation device in order to cause the presentation device to display the related information on the presentation device;
an interface that acquires second information for specifying a form of an action of the cook;
a determiner that specifies the action of the cook, based on the second information, and determines whether or not the specified action of the cook corresponds to a target cooking action, the target cooking action being one of the plurality of the cooking actions of the target recipe;
an acquirer that acquires an index value of the target cooking action indicating a degree of attention of the cook recommended for the target cooking action of the target recipe; and
a processor that alters amount of display information of the related information of the target cooking action displayed on the presentation device and output the altered amount of display information of the related information of the target cooking action to the presentation device, when the degree of attention indicated by the acquired index value of the target cooking action is greater than a reference threshold value, and when the specified action of the cook is determined to correspond to be the target cooking action of the target recipe, causes to output the related information of the target cooking action to the presentation device without altering the amount of display information, when the degree of attention indicated by the acquired index value of the target cooking action is less than or equal to the reference threshold value; and when the specified action is determined not to be one of the plurality of the cooking actions of the target recipe, outputting the specified action to the presentation device.

20. A terminal, comprising:

a presentation device that
   acquires first information including related information relating to a cooking action of a target recipe to be carried out by a cook, the target recipe including a plurality of cooking actions, and each of the plurality of cooking actions has an index value indicating a degree of attention of the cook recommended for a respective cooking action, and
   displays the related information of the plurality of cooking actions; and an interface that acquires second information for specifying a form of an action of the cook, and transmits the second information to a server, wherein, in a case where, in the server, it is determined that the action of the cook specified based on the second information corresponds to a target cooking action, the target cooking action being one of the plurality of the cooking actions of the target recipe, when the specified action of the cook is determined to correspond to be the target cooking action of the target recipe, the related information of the target cooking action having been altered to have an amount of display corresponding to an index value of the target cooking action indicating a degree of attention of the cook recommended for the target cooking action is transmitted from the server, and the related information of the target cooking action having the altered amount of display information is displayed on the presentation device, and the index value of the target cooking action being greater than a reference threshold value.

* * * * *